United States Patent [19]

Tomura et al.

[11] Patent Number: 5,189,358

[45] Date of Patent: Feb. 23, 1993

[54] ADAPTOR FOR MOUNTING PORTABLE RADIO APPARATUS TO MOVING BODY AND CHARGER FOR PORTABLE RADIO APPARATUS

[75] Inventors: Masashi Tomura; Hisamitsu Takagi; Yoshihiro Matsumoto, all of Kawasaki, Japan

[73] Assignee: Fujitsu Limited, Kawasaki, Japan

[21] Appl. No.: 764,705

[22] Filed: Sep. 24, 1991

[30] Foreign Application Priority Data

May 7, 1991 [JP] Japan ................................. 3-130244
May 31, 1991 [JP] Japan ................................. 3-129110

[51] Int. Cl.$^5$ ...................... H01M 10/44; H04B 1/38
[52] U.S. Cl. .......................................... 320/2; 455/89
[58] Field of Search ............... 320/2; 455/89, 90, 345, 455/346

[56] References Cited

U.S. PATENT DOCUMENTS 4,709,201 11/1987 Schaefer et al. .......................... 320/2
5,052,943 10/1991 Davis ...................................... 320/2
5,117,172 5/1992 Chen ...................................... 320/2

Primary Examiner—Steven L. Stephan
Assistant Examiner—Matthew Nguyen
Attorney, Agent, or Firm—Staas & Halsey

[57] ABSTRACT

An on-vehicle adaptor for a portable telephone which mounts a portable telephone so that the portable telephone is never disengaged unless a force larger than a certain level is applied thereto. The adaptor includes a case having a recess for receiving a swelled bottom of a large-capacity battery pack mounted to the portable telephone. The case has a pair of guides for guiding both sides of the portable telephone, a first projection adapted for engagement with a retaining slot formed in the portable telephone, and a second projection adapted for engagement with a retaining slot formed in the battery pack. The adaptor also includes a pair of ratchets adapted to enter and leave openings formed in the guides of the case, the ratchets each having a tapered portion whose thickness in the vertical direction is smaller at a front end thereof. Urging means are provided for urging the paired ratchets toward each other. The portable telephone is attached to the adaptor by engagement of the first and second projections with the associated retaining slots. Also disclosed is a portable telephone charger of a structure similar to that of the on-vehicle adaptor.

8 Claims, 30 Drawing Sheets

ADAPTOR FOR MOUNTING PORTABLE RADIO APPARATUS TO MOVING BODY AND CHARGER FOR PORTABLE RADIO APPARATUS

BACKGROUND OF THE INVENTION

1. Field of the Invention

The present invention relates to an adaptor for a radio apparatus, such as a portable telephone, suitable for mounting the portable radio apparatus to a moving body such as a automobile for example, as well as a charger for a portable radio apparatus for charging a battery pack mounted to the portable radio apparatus.

2. Description of the Prior Art

An ultimate object of communication is to permit the transmission or exchange of information immediately anytime, from anywhere and to anyone. To this end, mobile communication has been being developed gradually, in addition to the conventional point-to-point communication. Mobile communication indicates communication between moving bodies such as ships, automobiles and aircraft and general subscriber's stations, offices, etc., as well as communication between moving bodies. Recently, portable telephones, as a kind of mobile communication, have been developed actively.

In the case of using a portable telephone in a moving body such as an automobile, it is desirable that the portable telephone be attached to an on-vehicle adaptor fixed in the interior of the moving body, in consideration of keeping the position of the portable telephone constant when not in use.

Portable terminals, including such portable telephones, are generally provided with a battery which is charged by means of a charger, and it is desirable that the charging can be effected using the commercial power source for house service or the battery of an automobile. Heretofore, indoor chargers and on-vehicle adaptors having a charging function have been manufactured separately. This is because the on-vehicle adaptor mounted on an automobile is exposed to severe environmental conditions, e.g. vibration of the automobile, and various protective circuits are required, so designing an on-vehicle adaptor capable of withstanding such severe environmental conditions and using it also as an indoor charger does not pay.

Heretofore, in the case of using a portable telephone in the interior of an automobile, the portable telephone has been connected with an on-vehicle battery and antenna using connectors. There has also been adopted another structure, and according to this structure, a portable telephone holder is inserted into the window frame or the like of an automobile, in a connector removed state and the portable telephone is inserted into the portable telephone holder and is held thereby.

On the other hand, an indoor charger of a conventional portable telephone has a standing surface against which the portable telephone is stood inclinedly at a predetermined angle in a vertical direction, and also has a recess for insertion therein of a spare battery pack. Charging is performed while the portable telephone is kept standing against the standing surface of the charger. The spare battery pack is inserted into the recess of the charger and in this state it is charged.

Generally, in indoor chargers, it is not necessary to adopt a structure for holding down a portable telephone and a battery pack during charging because they do not undergo vibrations, unlike on-vehicle adaptors. The portable telephone is merely stood against the standing surface, and a mere insertion is required for the battery pack. When an indoor charger having such structure is used for a charger mounted in an automobile, there arise such problems as disengagement of the portable telephone and battery pack from the charger because of vibrations and impacts exerted thereon, infeasibility of charging because of unstable connection of charging terminals, and shortening of the battery life due to reset and the resulting overcharge.

SUMMARY OF THE INVENTION

Accordingly, it is an object of the present invention to provide an adaptor for mounting a portable radio apparatus to a moving body when the portable radio apparatus is to be used within the moving body such as an automobile, whereby the portable radio apparatus can be mounted easily and is never disengaged unless a force larger than a certain value is applied to the portable radio apparatus.

It is another object of the present invention to provide a portable radio apparatus charger for both indoor use and on-vehicle use whereby when the portable radio apparatus with a battery pack mounted thereto is inserted into the charger, it can be fixed easily and the battery pack can be charged easily and surely.

It is a further object of the present invention to provide a simple coupling system for the coupling of a portable radio apparatus charger with a battery pack charger.

In accordance with an aspect of the present invention there is provided an adaptor for a portable radio apparatus adapted to mount the portable radio apparatus with a battery pack attached thereto to a moving body, the battery pack including at least a large-capacity battery pack and a small-capacity battery pack which are to be mounted selectively, the large-capacity battery pack having a swelled bottom, with a retaining slot being formed in common to both the bottom of the large-capacity battery pack and that of the small-capacity battery pack, and with a retaining slot being formed in one end of the portable radio apparatus. The adaptor for the portable radio apparatus comprises a case for mounting the portable radio apparatus thereto, the case having a recess formed in the top thereof for fitting therein the swelled bottom of the large-capacity battery pack, the case further having a pair of guides for guiding both sides of the portable radio apparatus, a first projection adapted for engagement with the retaining slot of the portable radio apparatus, and a second projection adapted for engagement with the retaining slot of the battery pack, with openings being formed opposedly to each other in the inner surfaces of the paried guides; a printed circuit board accommodated within the case and with a charging circuit formed thereon; a pair of ratchets provided so that they are capable of entering and leaving the openings formed in the guides, the ratchets each having a tapered portion whose thickness in the vertical direction is smaller at a front end thereof; urging means for urging the paired ratchets toward each other; and a pair of charging terminals connected electrically to the charging circuit on the printed circuit board and projecting from the top of the case.

In accordance with another aspect of the present invention there is provided a charger for a portable radio apparatus capable of charging a battery pack attached to the portable radio apparatus, the battery pack including at least a large-capacity battery pack and a small-capacity battery pack which are to be mounted selectively, the large-capacity battery pack having a swelled bottom, with a retaining slot being formed in common to both the bottom of the large-capacity battery pack and that of the small-capacity battery pack, and with a retaining slot being formed in one end of the portable radio apparatus. The charger for the portable radio apparatus comprises a case for mounting the portable radio apparatus thereto, the case having a recess formed in the top thereof for fitting therein the swelled bottom of the large-capacity battery pack, the case further having a pair of guides for guiding both sides of the portable radio apparatus, a first projection adapted for engagement with the retaining slot of the potable radio apparatus, and a second projection adapted for engagement with the retaining slot of the battery pack; a printed circuit board accommodated within the case and with a charging circuit formed thereon; and a pair of charging terminals connected electrically to the charging circuit on the printed circuit board and projecting from the top of the case.

In accordance with a further aspect of the present invention there is provided a coupling system for the coupling of a portable radio apparatus charger capable of charging a battery pack mounted to the portable radio apparatus and a battery pack charger capable of charging a battery pack mounted directly thereto, the coupling system comprising a pair of first through holes formed in the portable radio apparatus charger; a pair of second through holes formed in the battery pack charger; and a pair of connecting rods inserted into the first and second through holes for integral coupling of the portable radio apparatus charger and the battery pack charger.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 1:
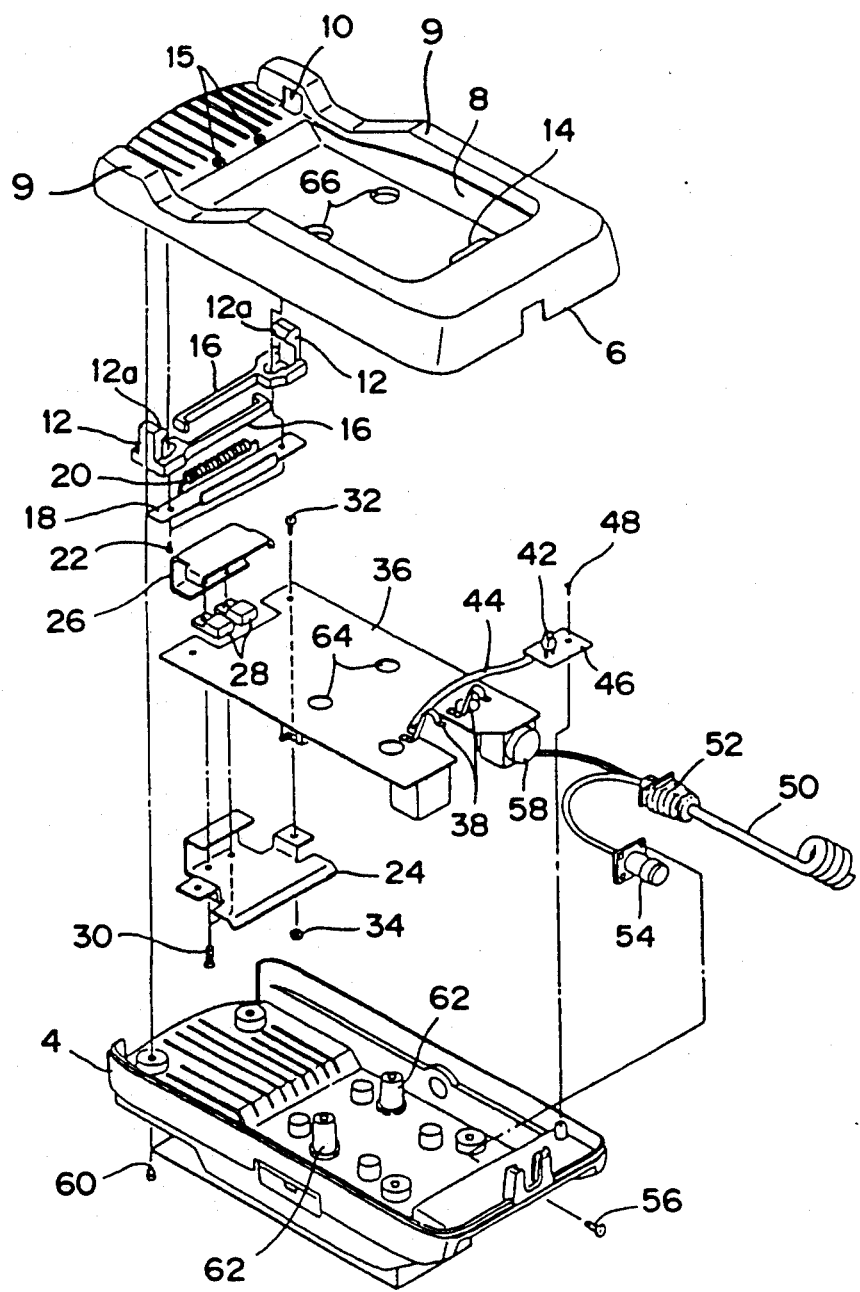
FIG. 1 is an exploded perspective view of an on-vehicle adaptor for a portable telephone according to an embodiment of the present invention.
Figure 2:
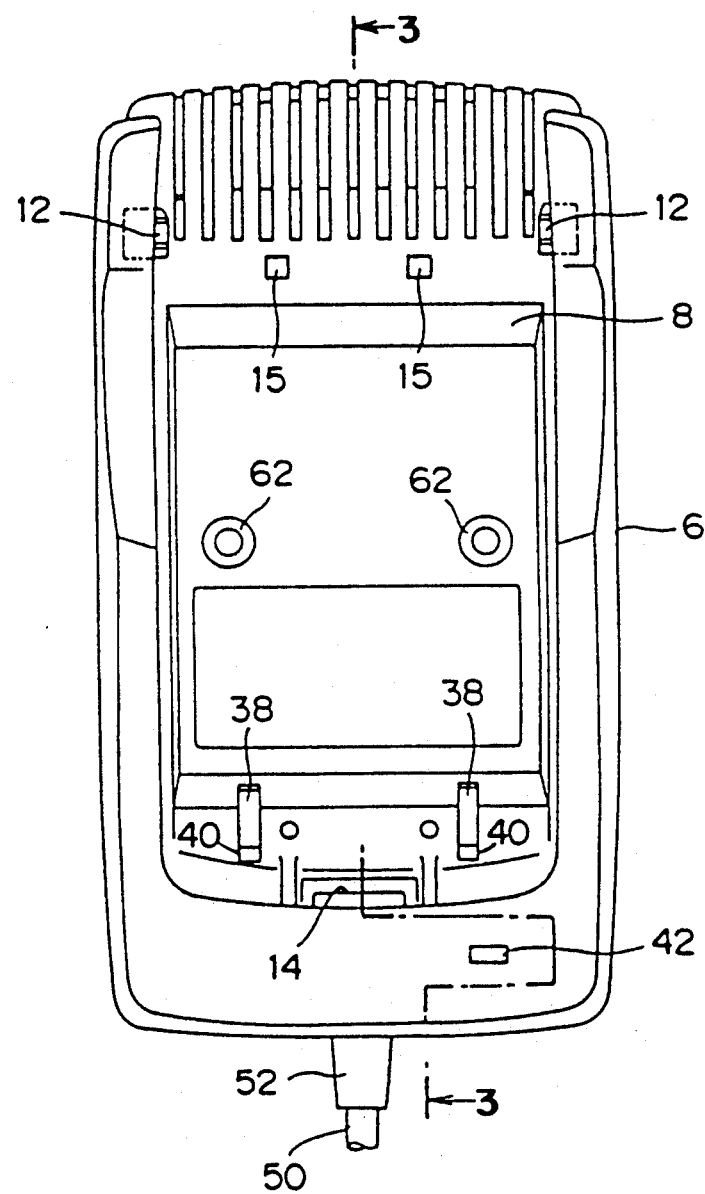
FIG. 2 is a plan view thereof.
Figure 3:
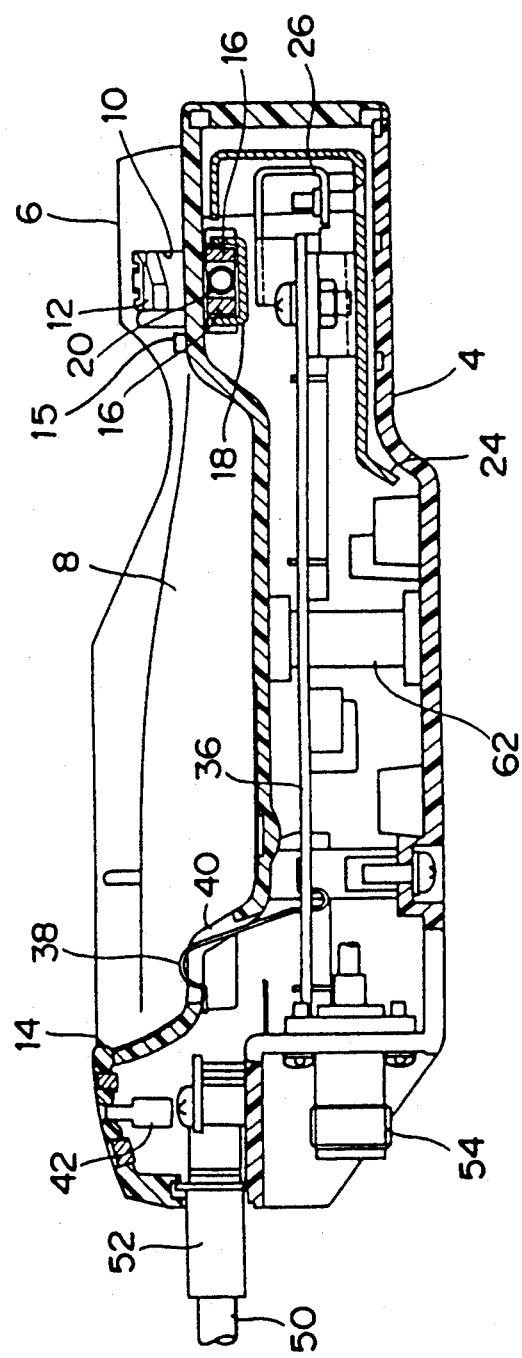
FIG. 3 is a sectional view taken along line 3—3 in FIG. 2.

FIG. 1 is an exploded perspective view of an on-vehicle adaptor for a portable telephone according to a preferred embodiment of the present invention; FIG. 2 is a plan view of the on-vehicle adaptor; and FIG. 3 is sectional view thereof taken along line A—A in FIG. 2.

The on-vehicle adaptor comprises a lower case 4, an upper case 6, as well as printed circuit boards and other mechanical parts mounted inside the lower and upper cases 4, 6. The top of the upper case 6 is formed with a pair of guides 9 for guiding both sides of a portable telephone and a recess 8 for seating thereon of a large-capacity battery pack mounted to the portable telephone. In the guides 9 there are formed openings 10 in opposed positions near end portions of the guides.

The members represented by the reference numeral 12 are ratchets provided so that they are capable of entering and leaving the openings 10. The ratchets 12 each have a tapered portion 12a whose thickness in the vertical direction is smaller at a front end thereof. A lug 14 is formed on an end portion of the recess 8 on the side opposite to the side where the openings 10 are formed, and a retaining slot formed in an end portion of the portable telephone comes into engagement with the lug 14. Further on a front upper surface portion of the upper case 6 there are formed a pair of lugs 15 for fitting into retaining slots formed in common to both large- and small-capacity battery packs.

The two ratchets 12 are each integrally provided with a rib 16 having an L-shaped front end. The ribs 16 are in the position of point symmetry with each other and are supported by a plate 18 slidably with respect to the inner wall surface of the upper case 6, the plate 18 being fixed to the upper case 6 with bolts 22. Between the L-shaped front ends of the ribs 16 there is interposed a coil spring 20 which is compressed by being inserted therebetween and acts in an expanding direction, whereby the two ratchets 12 are urged toward each other.

The reference numerals 24 and 26 represent radiation fins, and a regulator 28 for a power circuit is fixed with bolts 30 between the radiation fins 24 and 26. Further, the radiation fin 24 is fixed to a printed circuit board 36 with bolts 32 and nuts 34.

The reference numeral 38 denotes a charging terminal fixed to the printed circuit board 36. By virtue of its own elasticity each charging terminal 38 projects into the recess 8 through an opening 40 formed in the upper case 6. The charging terminals 38 come into contact with charging terminals of a battery pack mounted to the portable telephone upon mounting of the portable telephone to the adaptor, thereby permitting charging of the battery pack of the portable telephone.

The reference numeral 42 denotes an operation indicating lamp, e.g. LED, connected to the printed circuit board 36 through a cord 44. A printed circuit board 46 on which the operation indicating lamp 42 is mounted is fixed to the lower case 4 with a bolt 48.

The reference numeral 50 denotes a curled cord for connection between the portable telephone and the on-vehicle adaptor. The curled cord 50 is fixed to the lower case 4 through a bushing 52 and it includes a line for the supply of electric power to the portable telephone and also includes a coaxial cable for connecting the portable telephone to an external antenna.

The curled cord 50 further includes lines for detecting the connect of the curled cord and that of a hand-free unit and a 3W booster. There are also provided lines for the transmission of signals when the hand-free unit and the 3W booster are connected.

The reference numeral 54 denotes a connector for the coaxial cable. The connector 54 is fixed to the lower case 4 with a bolt 56. The reference numeral 58 denotes a connector for power input which is fixed to the printed circuit board 36 and is exposed to the exterior from the lower case 4. The electric power from the automobile is supplied by connecting a cigar lighter cord to the connector 58.

The printed circuit board 36 is mounted to the lower case 4 in a one-touch manner with a pawl (not shown) formed on the same case. The lower case 4 and the upper case 6 are integrally fixed together with bolts 60. The portions represented by the numeral 62 are fixing bolt support portions formed in the interior of the lower case 4, which are exposed to the recess 8 through holes 64 formed in the printed circuit board 36 and further through holes 66 formed in the upper case 6.

Therefore, this on-vehicle adaptor after assembly thereof can be fixed to the interior of the automobile directly using suitable bolts. It is also possible to mount a quick charger or the like to the on-vehicle adaptor as will be described later and then fix the on-vehicle adaptor indirectly to the interior of the automobile.

Figure 4:
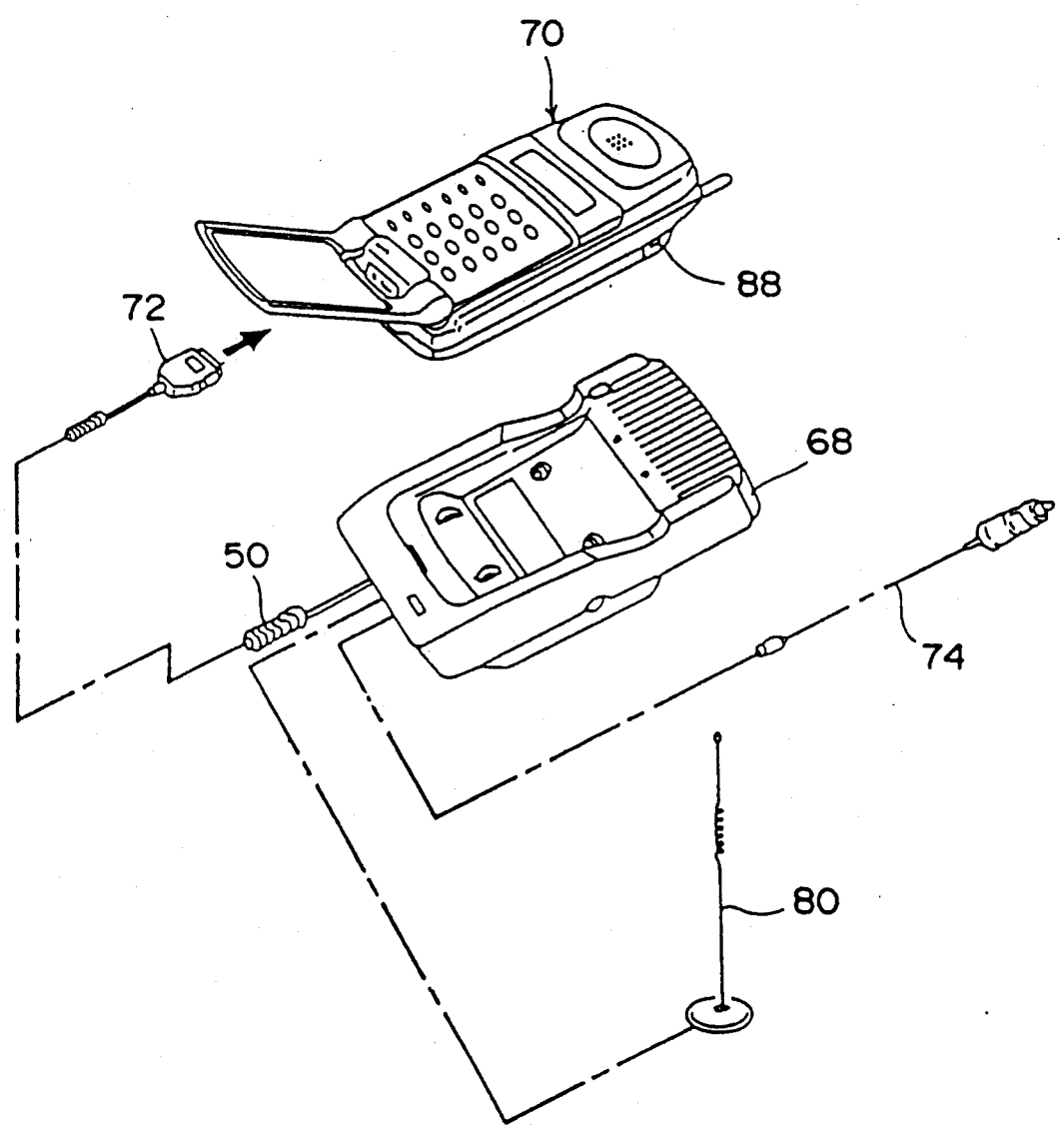
FIG. 4 is an exploded perspective view illustrating a connected state of the on-vehicle adaptor.

Referring to FIG. 4, which is a connection diagram in the case of fixing the on-vehicle adaptor directly to the interior of the automobile, the reference numerals 68 and 70 denote the on-vehicle adaptor and the portable telephone, respectively. The on-vehicle adaptor 68 and the portable telephone 70 are electrically connected together by attaching a connector 72 connected to one end of the curled cord 50 to the portable telephone 70.

The supply of electric power to the on-vehicle adaptor 68 is effected by connecting the power input terminal 58 of the on-vehicle adaptor with a power output terminal (not shown) provided on the automobile side through a cigar lighter cord 74 or the like. The reference numeral 80 denotes an external antenna attached to the outside of the automobile. The external antenna 80 is connected to the coaxial connector 54.

In the case of using the portable telephone 70 in the interior of automobile, by attaching the , connector 72 to the portable telephone 70, not only is it made possible to supply electric power through the cigar lighter cord 74 but also the external antenna 80 can be used in good sensitivity characteristic. When the connector 72 is removed from the portable telephone 70, the portable telephone can be used alone through a battery and an antenna which are incorporated in the portable telephone.

When the portable telephone 70 is not in use, by mounting it to the on-vehicle adaptor 68, it is made possible to charge the incorporated battery automatically.

Figure 5:
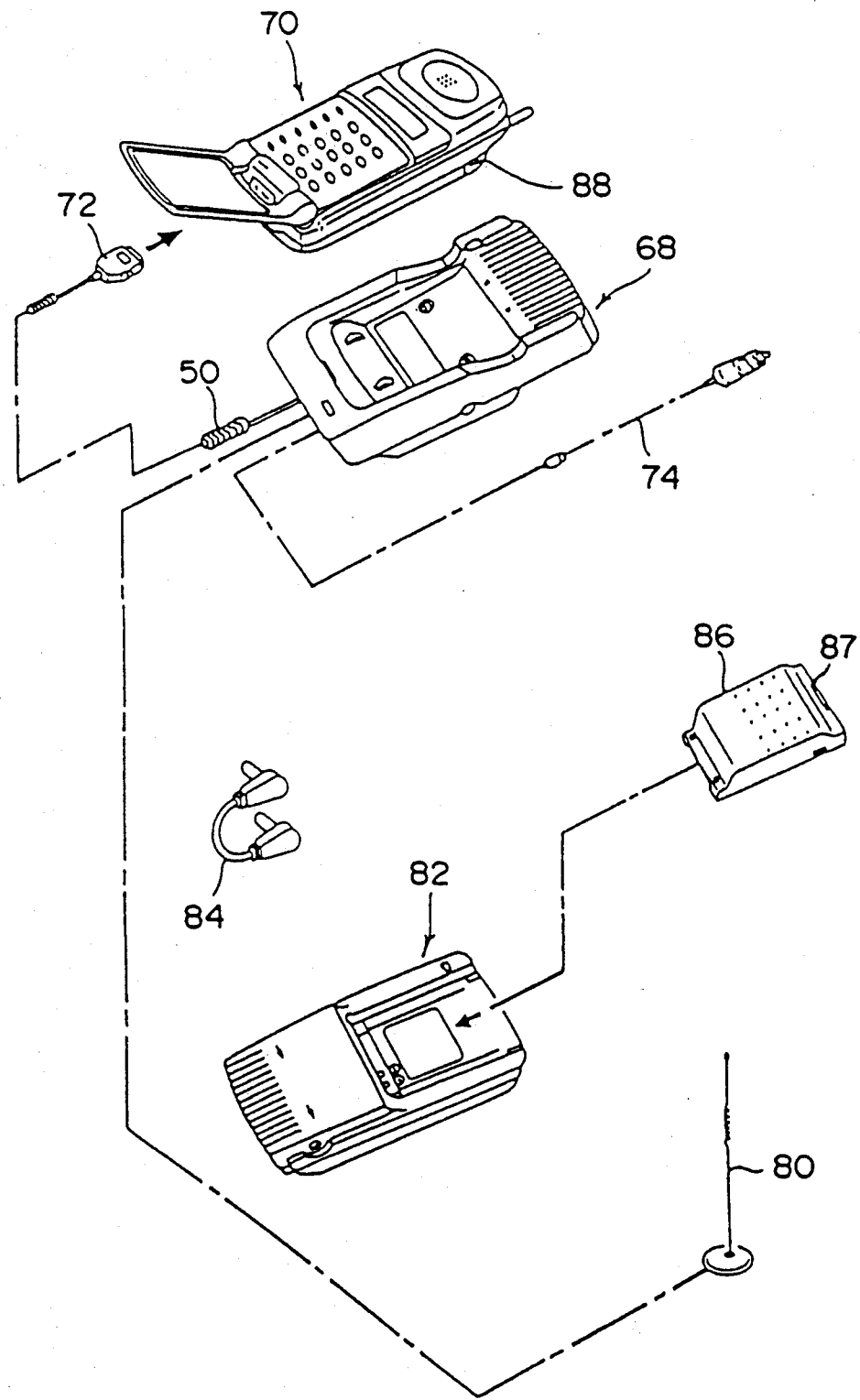
FIG. 5 is an exploded perspective view illustrating another connected state of the on-vehicle adaptor.

FIG. 5 is a connection diagram in the case of fixing the on-vehicle adaptor to the interior of the automobile together with a quick charger for a battery pack. In the illustrated example, a quick charger 82 is disposed below and connected to the on-vehicle adaptor 68 using a connecting cord 84. When a battery pack 86 capable of being mounted to the portable telephone 70 is set, the quick charger 82 charges the battery pack 86 using a relatively large electric current.

Figure 6:
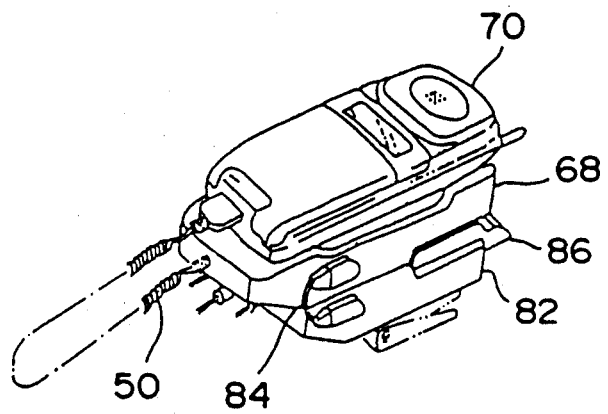
FIG. 6 is a perspective view showing an assembled state of the adaptor of FIG. 5.
Figure 7:
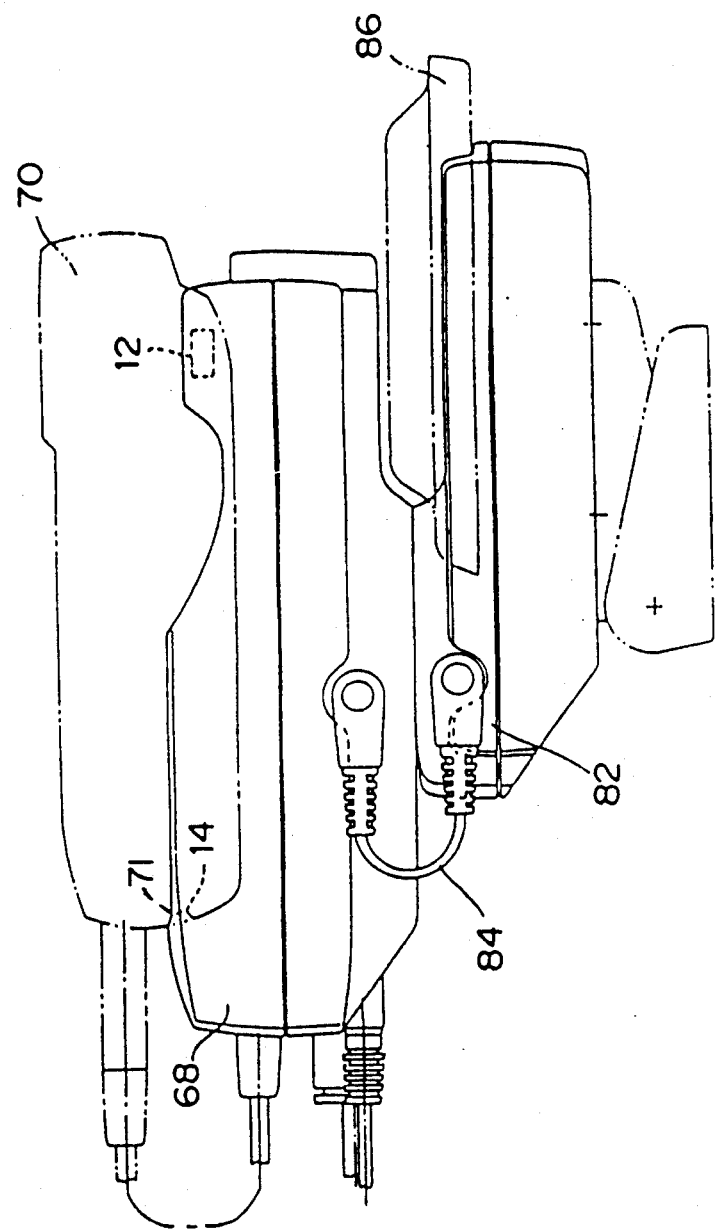
FIG. 7 is a side view of the adaptor of FIG. 5.

FIG. 6 is a perspective view of the on-vehicle adaptor 68 and the quick charger 82 both fixed in the interior of the automobile and with the portable telephone 70 mounted to the on-vehicle adaptor 68, and FIG. 7 is a side view thereof.

For mounting the portable telephone 70 to the on-vehicle adaptor 68, as shown in FIG. 7, a retaining slot 71 formed in an end portion of the portable telephone is brought into engagement with the lug 14 of the adaptor and in this state the portable telephone 70 is turned clockwise in FIG. 7, allowing concave portions 88 (see FIG. 5) formed in both side portions of the portable telephone to be engaged with the ratchets 12 and also allowing a pair of retaining slots 87 formed in the battery pack to come into engagement with the lugs 15.

Since the ratchets 12 are formed with tapered portions, the ratchets retreat or retract as the portable telephone 70 is pushed in, and when the concave portions 88 have arrived at positions corresponding to the ratchets 12, the ratchets again advance back to their original position. Since this state is maintained by the urging force of the coiled spring 20, the portable telephone 70 is never disengaged from the on-vehicle adaptor 68 unless a force larger than a predetermined level is applied to the portable telephone, thus making it possible to cope with vibrations, etc. of the automobile.

In using the portable telephone 70, the portable telephone can be removed from the on-vehicle adaptor 68 easily by pulling it up with a force larger than the predetermined level.

Figure 8:
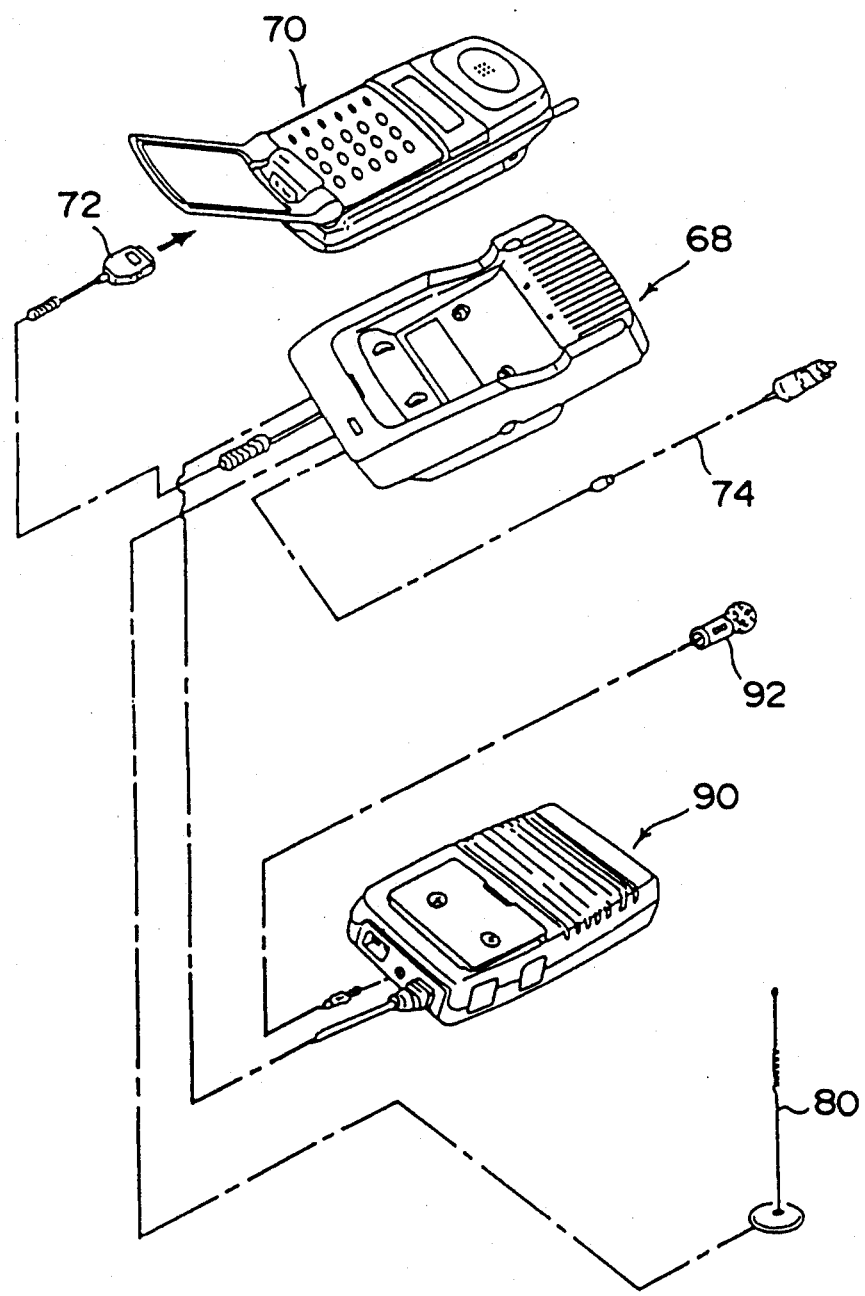
FIG. 8 is an exploded perspective view illustrating a further connected state of the on-vehicle adaptor.

FIG. 8 is a connection diagram in the case of mounting the on-vehicle adaptor to the interior of the automobile together with a hand-free unit. In this example, in addition to the construction shown in FIG. 4, a hand-free unit 90 is disposed below the on-vehicle adaptor 68 and both are connected using a connecting cord. In the hand-free unit 90 there is incorporated a speaker (not shown), and with a microphone 92 being connected thereto.

In the case where the hand-free unit 90 is used, telephonic conversation can be made using the aforementioned speaker and the microphone 92, so it is possible to make conversation in a mounted state of the portable telephone 70 to the on-vehicle adaptor 68 without the need of holding it by hand. For reference, FIG. 9, which is a perspective view, shows a state in which the on-vehicle adaptor 68 is fixed in the interior of the automobile together with the hand-free unit 90 and the portable telephone 70 is seated on the recess of the adaptor 68.

Figure 10:
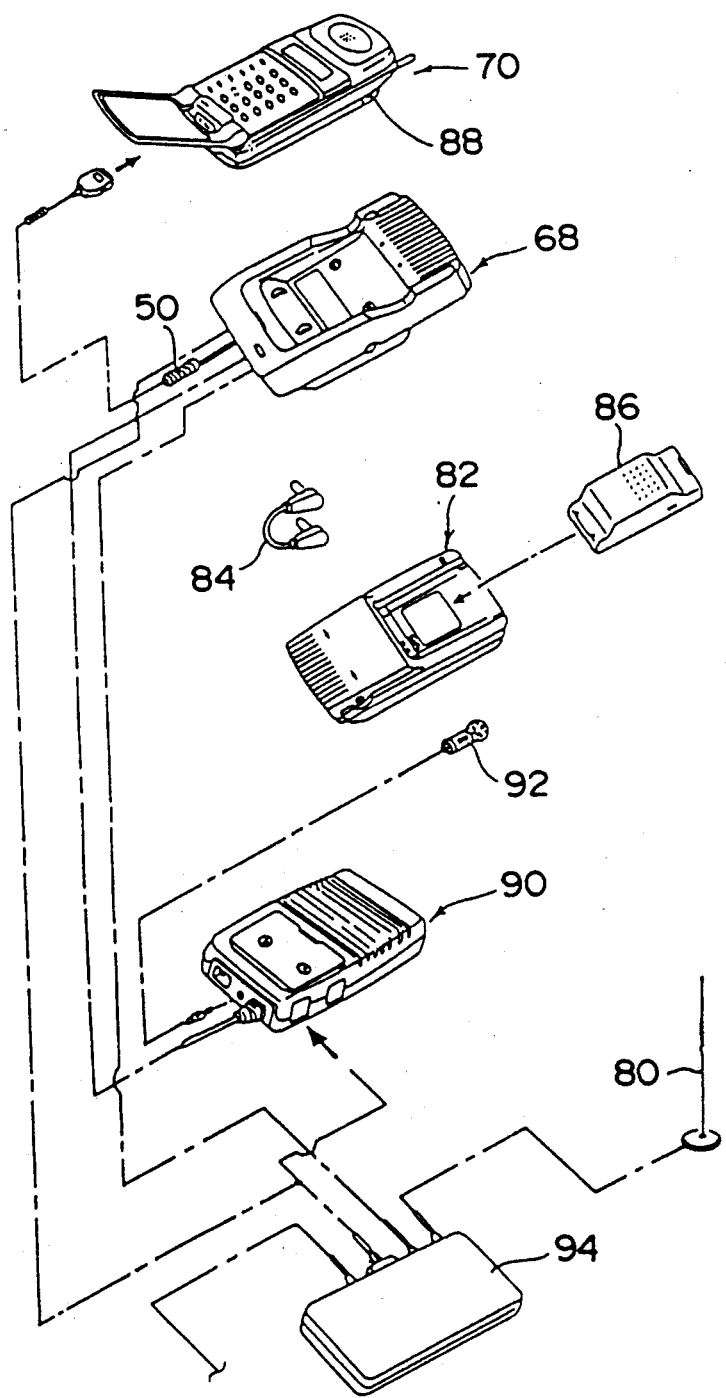
FIG. 10 is an exploded perspective view illustrating a still further connected state of the on-vehicle adaptor.

FIG. 10 is a connection diagram in the case of fixing the on-vehicle adaptor in the interior of the automobile together with the quick charger 82 and the hand-free unit 90. In this example, there is made connection with the external antenna 80 through a 3W booster 94 for improving the sensitivity characteristic in both transmission and reception. Further, the quick charger 82 is disposed under the on-vehicle adaptor 68, and the hand-free unit 90 is disposed under the quick charger 82, as illustrated in a perspective view in FIG. 11.

Figure 12:
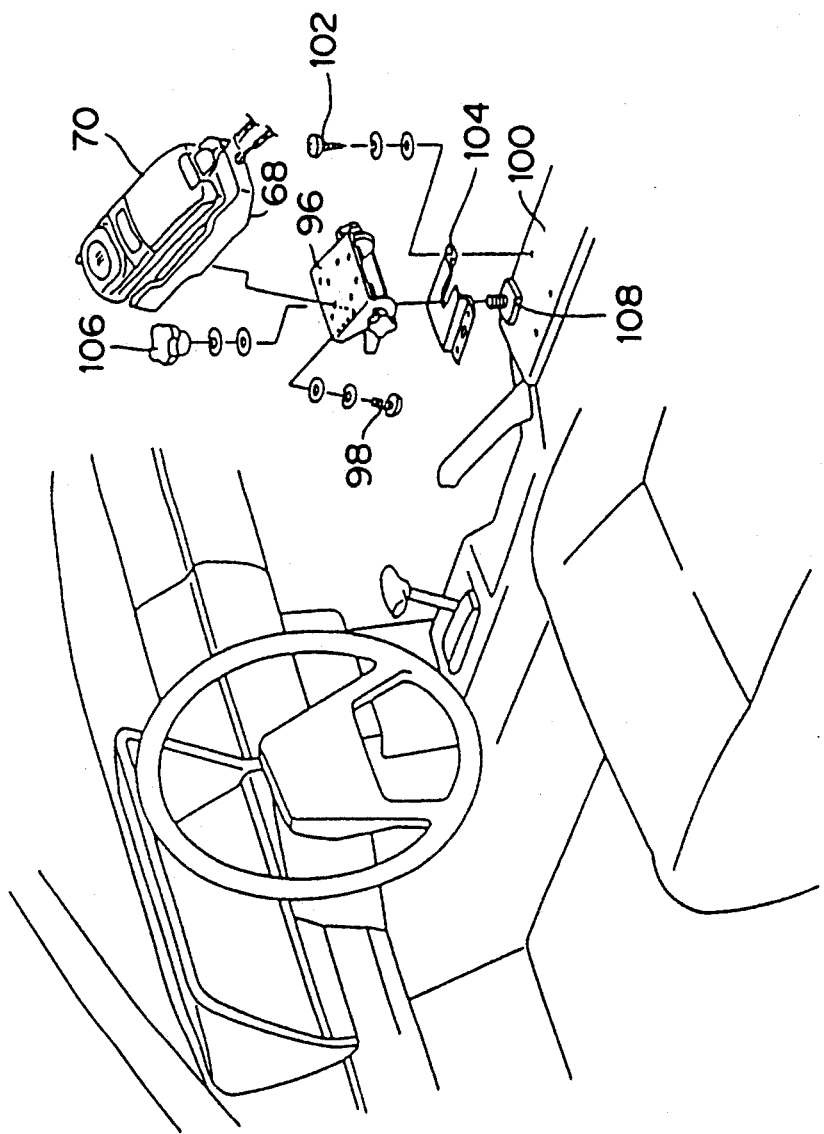
FIG. 12 is an exploded perspective view of the portable telephone about to be mounted to an arm rest portion of an automobile.

FIG. 12 is an exploded perspective view showing a state in which the on-vehicle adaptor is about to be mounted to an armrest portion of the automobile. The on-vehicle adaptor 68 is fixed with bolts 98 to a movable mount or clamshell 96 whose mounting angle is variable. To the automobile armrest portion, indicated at 100, is fixed a mounting piece 104 with bolts 102, and the movable mount 96 is fixed to the mounting piece 104 with a knob 106 and a bolt 108. In this construction, the mounting angle of the on-vehicle adaptor 68 can be adjusted as necessary and this is convenient for the use of the portable telephone 70.

Figure 9:
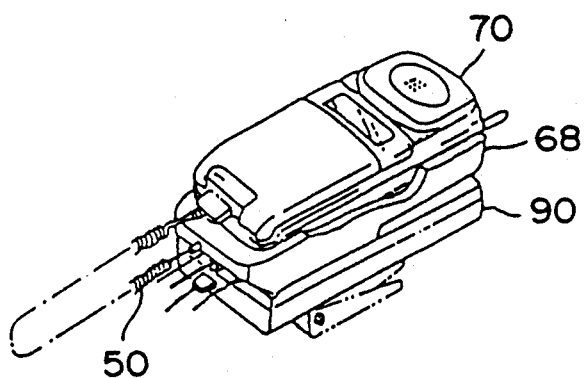
FIG. 9 is a perspective view showing an assembled state of the adaptor of FIG. 8.
Figure 11:
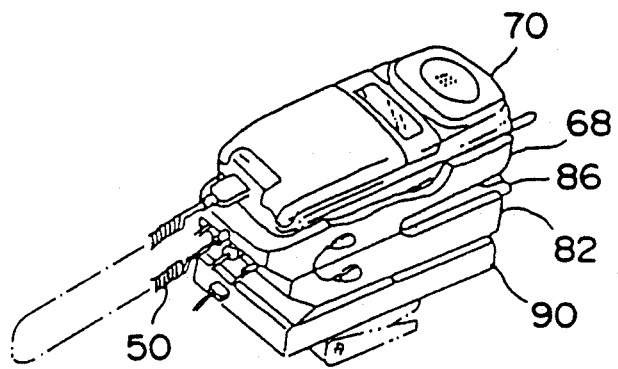
FIG. 11 is a perspective view showing an assembled state of the adaptor of FIG. 10.

In the example illustrated in FIG. 12, the on-vehicle adaptor 68 alone is fixed to the variable mount 96, but in the case of adopting the various modes of use of the on-vehicle adaptor shown in FIGS. 6, 9 and 11, it is possible to fix the quick charger 82 and/or the hand-free unit 90 between the on-vehicle adaptor 68 and the variable mount 96, using a long bolt or the like.

Figure 13:
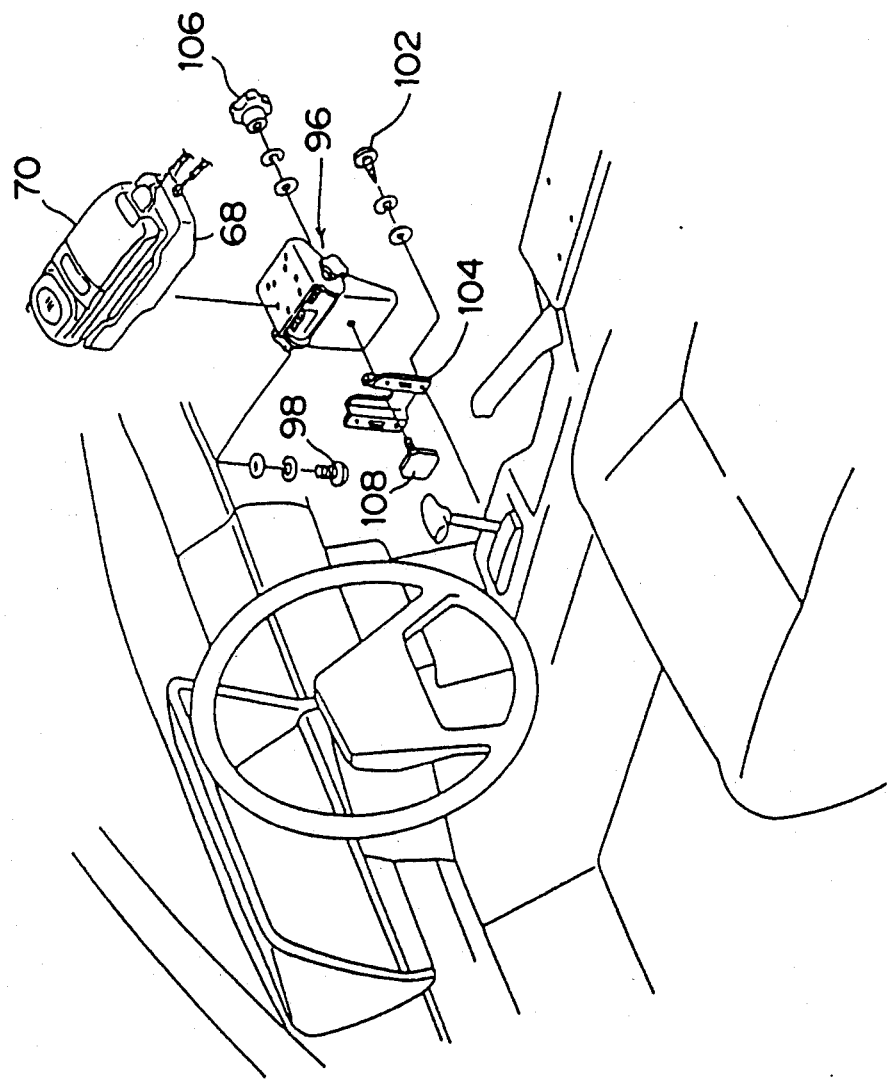
FIG. 13 is an exploded perspective view of the portable telephone about to be mounted to a side face of a console box.

FIG. 13 is an exploded perspective view showing a state in which the on-vehicle adaptor is about to be mounted to a side face of a console box of the automobile. In this case, the mounting piece 104 is attached to the side face of the console box, and the angle of the movable mount 96 is set to about 90°. Thus, in the case of fixing the on-vehicle adaptor 68 in the automobile interior, it is possible to adopt various forms.

Figure 14:
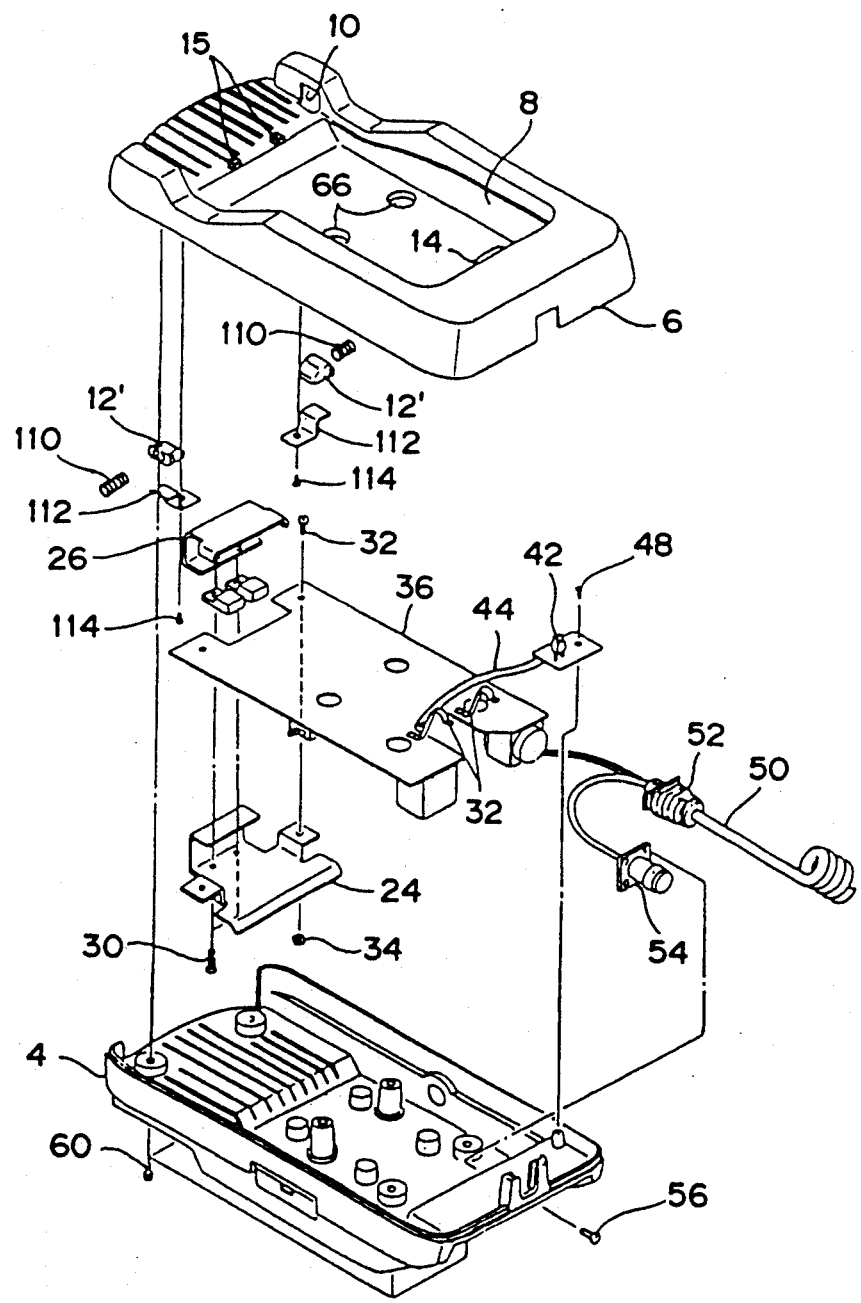
FIG. 14 is an exploded perspective view of an on-vehicle adaptor according to another embodiment of the present invention.

FIG. 14 is an exploded perspective view of an on-vehicle adaptor according to another embodiment of the present invention. In this embodiment, coil springs 110 acting in respective expanding directions are interposed between ratchets 12' and the inner wall surface of the upper case 6, and the ratchets 12' are each supported by a plate 112. The plates 112 are fixed to the upper case 6 with bolts 114. Also in this construction, since the ratchets are urged toward each other, the mounting and removal of the portable telephone with respect to the on-vehicle adaptor are easy.

Now, a charger for a portable telephone embodying the present invention will be described below with reference to FIGS. 15 to 17.

Figure 15:
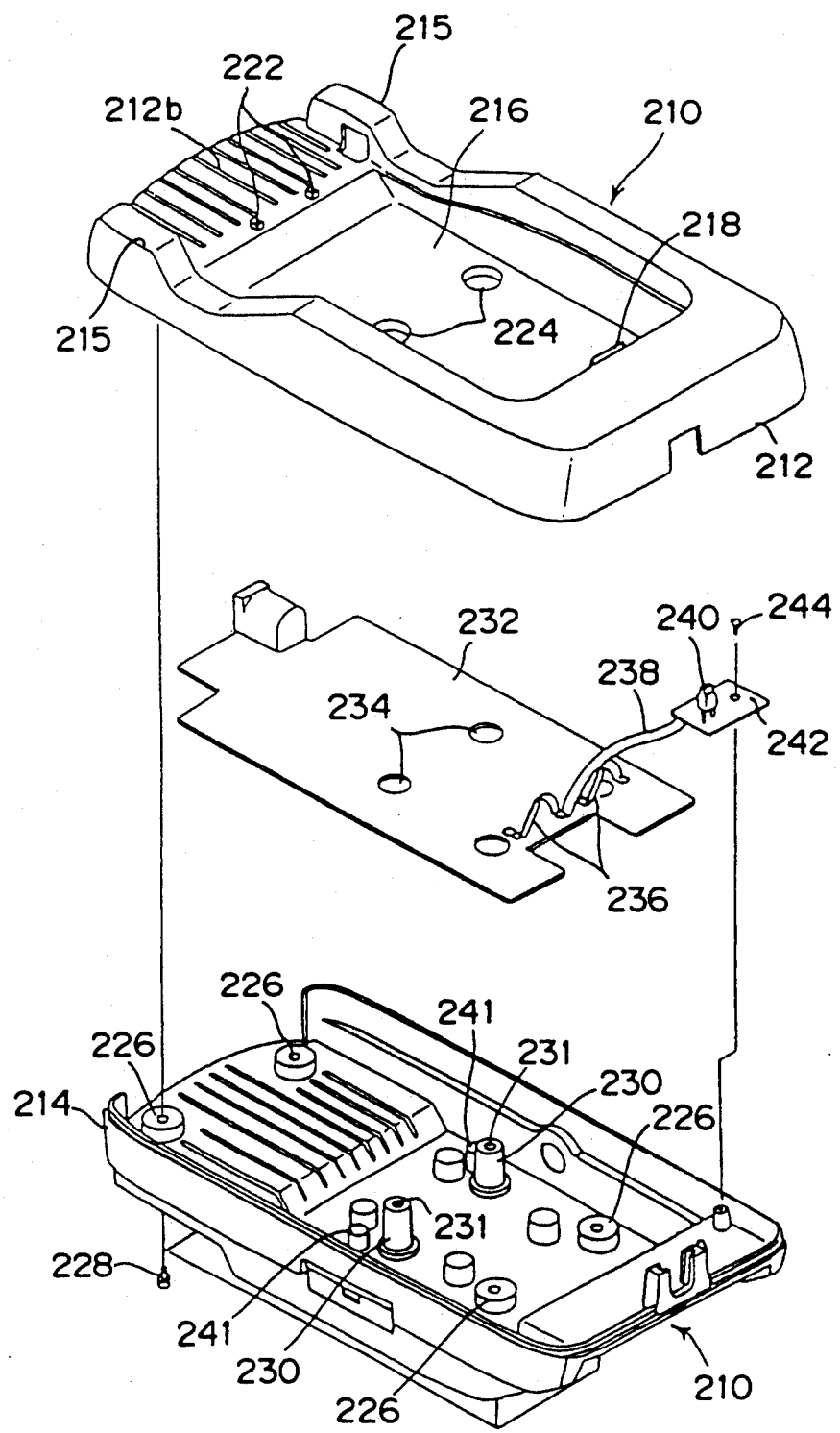
FIG. 15 is a perspective view of a portable telephone charger embodying the present invention.

As best seen in FIG. 15, a case of a charger 210 comprises an upper case 212 and a lower case 214. The top of the upper case 212 is formed with a recess 216 for fitting therein of a swelled bottom of a large-capacity battery pack, and on both sides of the recess 216 there are formed a pair of guides 215 for guiding both sides of the portable telephone.

Figure 16:
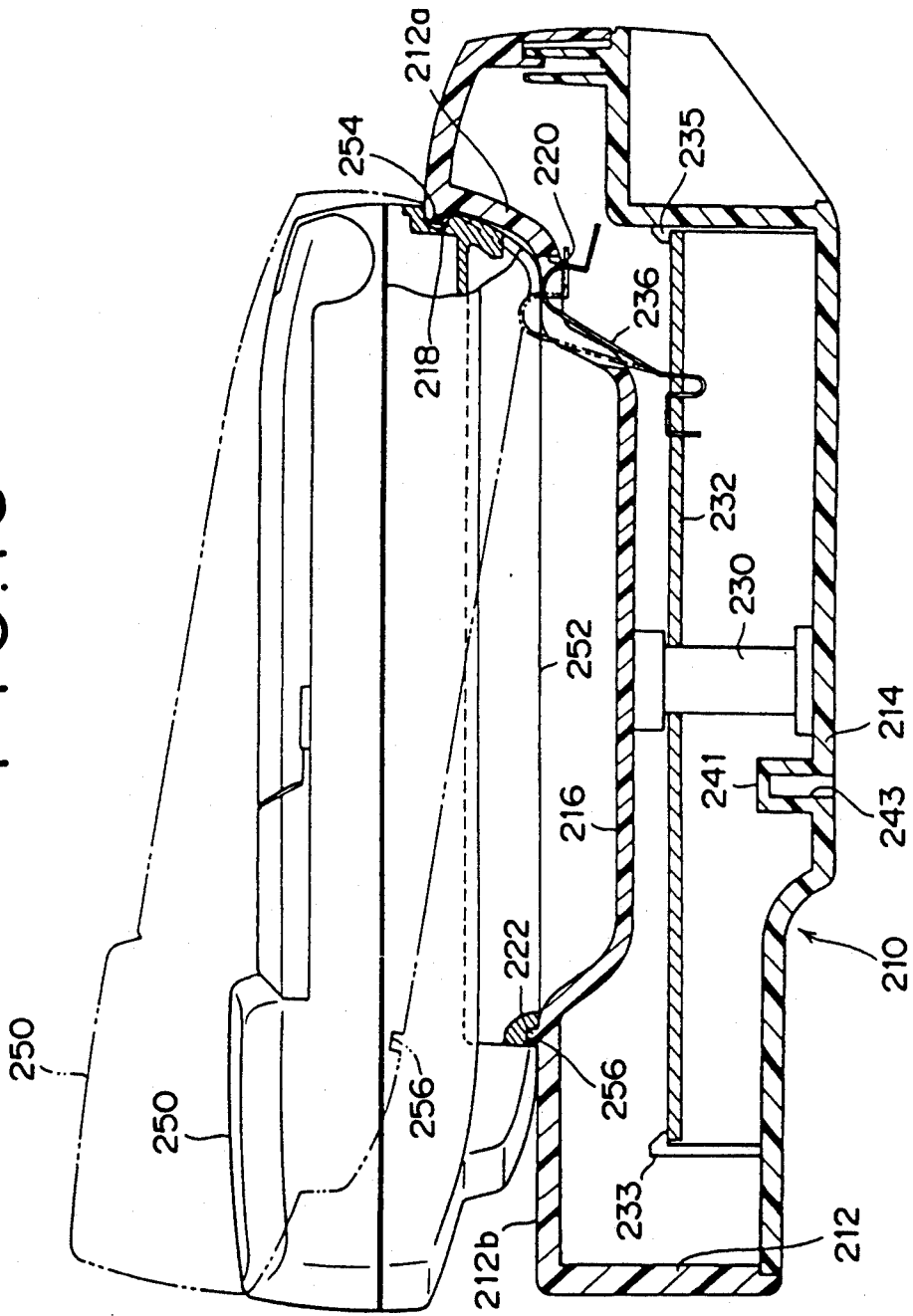
FIG. 16 is a sectional view of the charger shown in FIG. 15 with a small-capacity battery pack mounted thereto.
Figure 17:
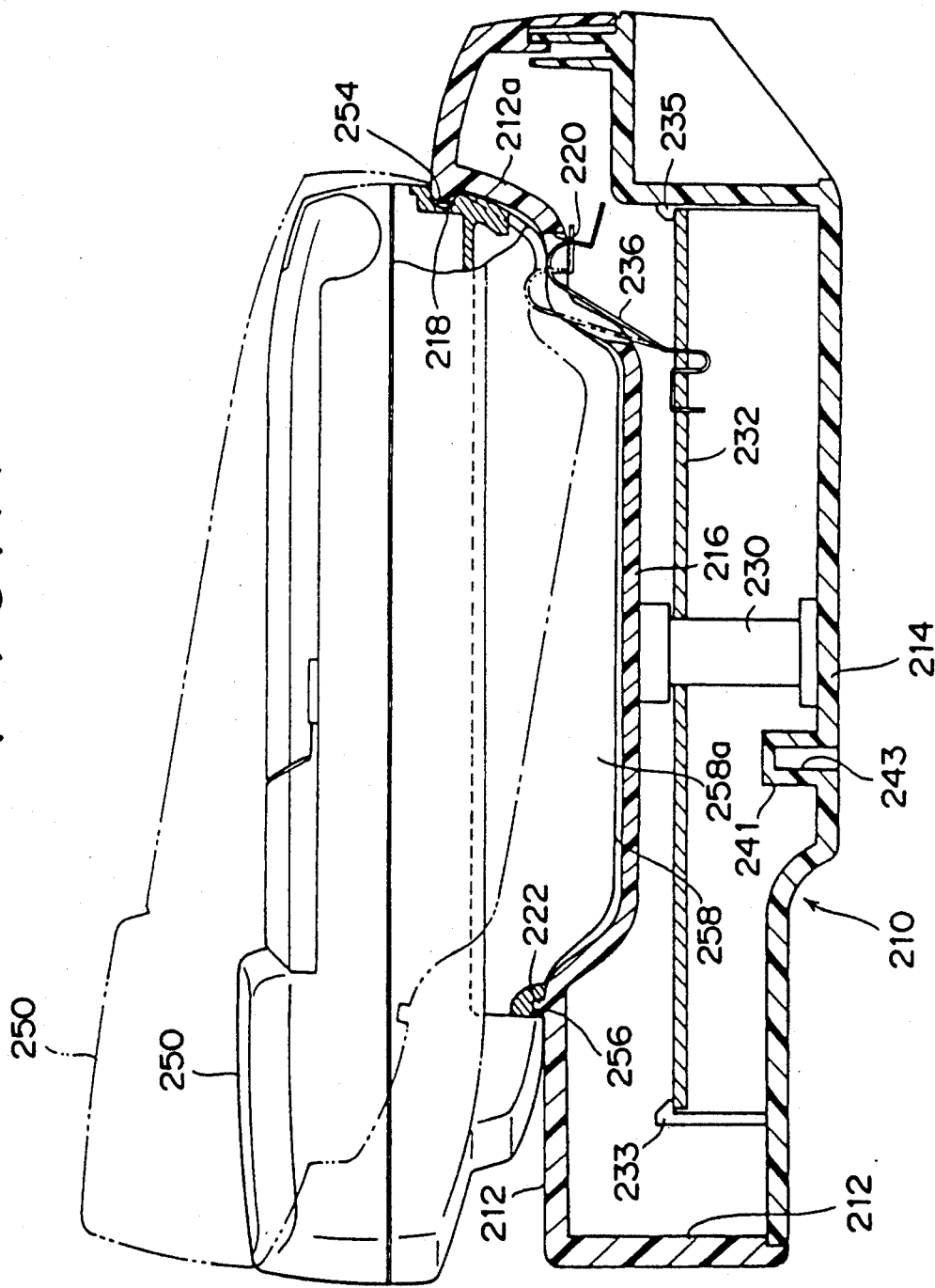
FIG. 17 is a sectional view of the charger shown in FIG. 15 with a large-capacity battery pack mounted thereto.

As is apparent upon reference to not only FIG. 15 but also FIGS. 16 and 17, a lug 218 for fitting into a retaining slot of the portable telephone is formed on an upper rear end side 212a of the upper case 212, while on an upper surface of a plate-like front end side 212b there are formed a pair of lugs 222 for fitting into retaining slots formed in common to both large- and small-capacity battery packs. Further, a pair of holes 224 are formed in the bottom of the recess 216 of the upper case 212.

The lower case 214 is provided with four fixing bosses 226 each having a fixing hole. The lower case 214 is integrally fixed to the upper case 212 by inserting bolts 228 into the fixing holes of the bosses 226. Further, approximately centrally of the lower case 214 there are integrally formed a pair of bosses 230 each having a hole 231.

The numeral 232 denotes a printed circuit board with a charging circuit formed thereon. The printed circuit board 232 has a pair of holes 234 for insertion of the bosses 230 therein. The members represented by the reference numeral 236 are charging terminals fixed to the printed circuit 232. The charging terminals 236, which are formed of an elastic material, are projecting into the recess 216 through an opening 220 formed in the upper case 212. When the portable telephone is mounted into the recess 216, the charging terminals 236 come into contact with charging terminals of a battery pack attached to the portable telephone, thereby permitting charging of the battery pack.

The reference numeral 240 denotes an operation indicating lamp, e.g. LED, connected to the printed circuit board 232 through a cord 238. A printed circuit board 242 onto which the operation indicating lamp 240 is mounted is fixed to the lower case 214 with a bolt 244. The printed circuit board 232 is fixed inside the case by being engaged with pawls formed on the lower case 214, as shown in FIGS. 16 and 17.

Next, an explanation will be made below about the method of charging a small-capacity battery pack 252 and a large-capacity battery pack 258 which are mounted to the portable telephone indicated at 250, using the charger 210 of this embodiment, with reference to FIGS. 16 and 17.

Referring first to FIG. 16, there is illustrated a state in which the small-capacity battery pack 252 has been mounted to the portable telephone 250. By fitting a retaining slot 254 of the portable telephone 250 onto the lug 218 formed on an upper part of the rear end side of the charger 210 and by fitting retaining slots 256 formed in the small-capacity battery pack 252 onto the paired lugs 222 formed on the upper surface of the front end side of the charger 210, the portable telephone 250 is mounted to the charger 210.

In this case, the small-capacity battery pack 252 is not fitted in the recess 216 formed in the upper surface of the charger 210, but the bottom thereof becomes approximately coplanar with the plate-like front end portion 212b of the charger 210. When the portable telephone 250 is mounted to the charger 210, the charging terminals 236 of the charger 210 are deformed elastically and come into pressure contact with the charging terminals of the battery pack 252, whereby the small-capacity battery pack 252 attached to the portable telephone 250 can be charged.

Although the pressure resulting from such elastic deformation of the charging terminals 236 is applied to the portable telephone 250, the disengagement of the portable telephone 250 from the charger 210 under the elastic force of the charging terminals 236 is prevented because the lug 218 is fitted in the retaining slot 254 of the portable telephone 250 and the lugs 222 are fitted in the retaining slots 256 of the small-capacity battery pack 252.

Referring now to FIG. 17, there is illustrated a state in which the portable telephone 250 with the large-capacity battery pack 258 attached thereto is mounted to the charger 210 to charge the battery pack 258. The portable telephone 250 is mounted to the charger 210 by fitting a swelled bottom 258a of the large-capacity battery pack 258 into the recess 216 of the charger 210.

Since also in the large-capacity battery pack 258 there are formed the retaining slots 256 in the same positions as in the small-capacity battery pack 252, by fitting the lugs 222 of the charger 210 into the retaining slots 256 and by fitting the lug 218 into the retaining slot 254 of the portable telephone 250, the portable telephone with the large-capacity battery pack 258 attached thereto is fixed easily to the charger 210 of the portable telephone.

Now, an explanation will be made below about various modes of use of the charger of this embodiment with reference to FIGS. 18 to 25.

Figure 18:
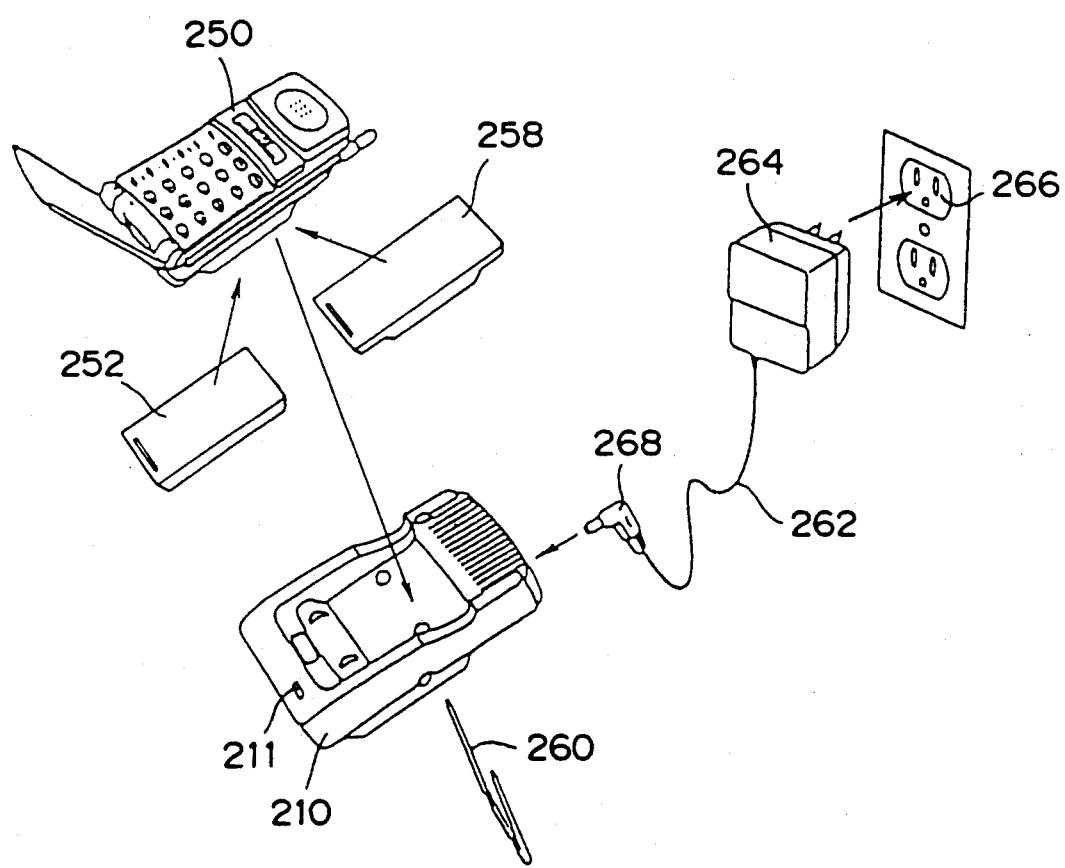
FIG. 18 is an exploded perspective view showing the charger as used on a desk.
Figure 19:
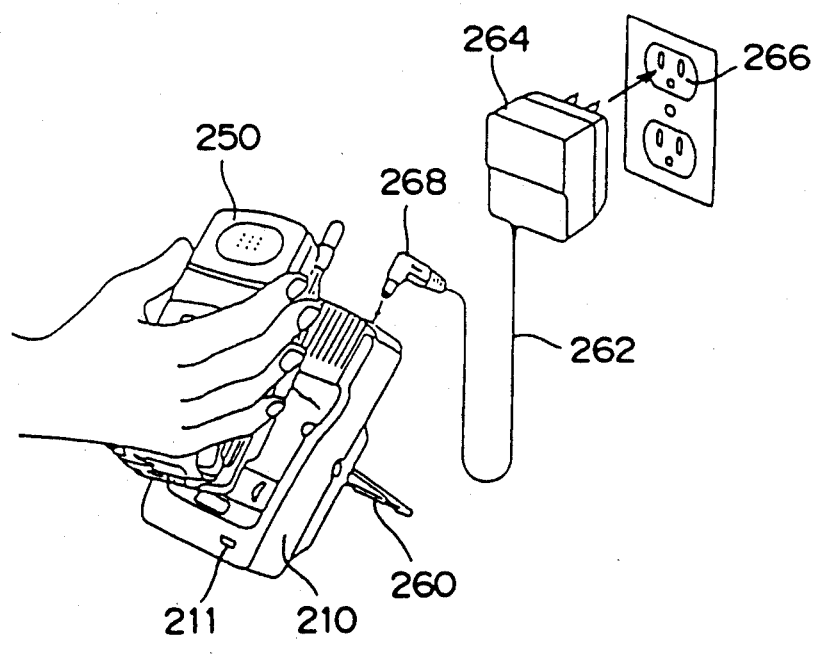
FIG. 19 is a perspective view showing the charger as used on a desk.

Referring first to FIGS. 18 and 19, there is illustrated a state of use of the charger on a desk. Either the small-capacity battery pack 252 or the large-capacity one 258 is mounted to the portable telephone 250, which is then mounted to the charger 210. By inserting a stand 260 into hole 243 formed in a pair of bosses 241 of the charger 210, the charger can be supported at any desired angle by the stand 260, as shown in FIG. 19. The small-capacity battery pack 252 or the large-capacity battery pack 258 can be charged by inserting a plug of an AC/DC adaptor 264 attached to one end of a cord 262 into a plug socket 266 of a commercial power source for household use and then connecting a connector 268 attached to the other end of the cord 262 to the charger 210. The charger 210 is provided with a LED 211, and one can know the completion of charging from a change in color of the LED into green for example.

Figure 20:
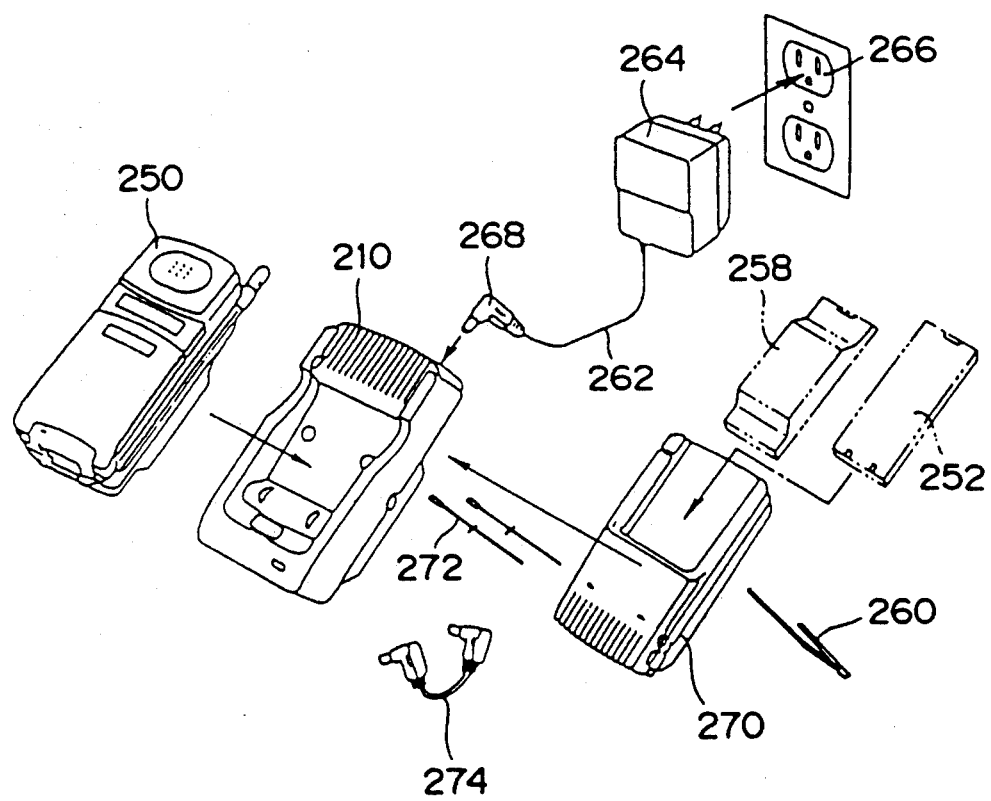
FIG. 20 is an exploded perspective view of the portable telephone charger in combination with a battery pack charger.
Figure 21:
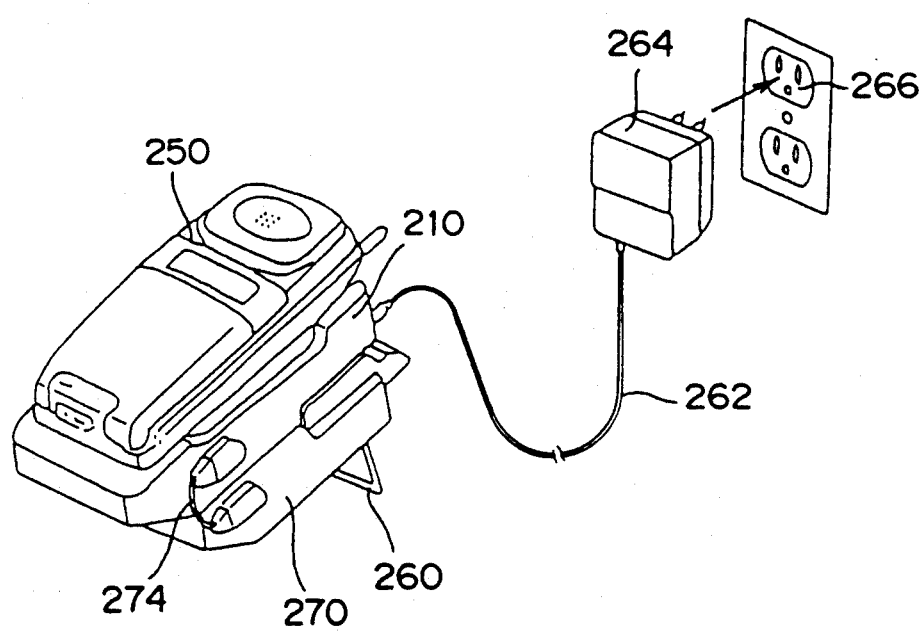
FIG. 21 is a perspective view showing an assembled state of the combination of FIG. 20.

The following description is now provided about a mode of use in a combination of the portable telephone charger and a battery pack charger (a quick charger) with reference to FIGS. 20 and 21. By inserting one end of each of a pair of connecting rods 272 into the holes 231 of the charger 210 and inserting opposite ends thereof into holes formed in the battery pack charger 270, the chargers 210 and 270 are connected mechanically and also connected electrically through a cord 274.

By mounting either the small-capacity battery pack 252 or the large-capacity battery pack 258 to the battery pack charger 270 and supporting the charger 270 with the stand 260, both the battery pack mounted to the portable telephone 250 and the battery pack mounted to the battery pack charger 270 can be charged simultaneously in such a state as shown in FIG. 21. The details of a coupling system for the charger 210 and the battery pack charger 270 will be described later with reference to FIGS. 26 to 30.

Figure 22:
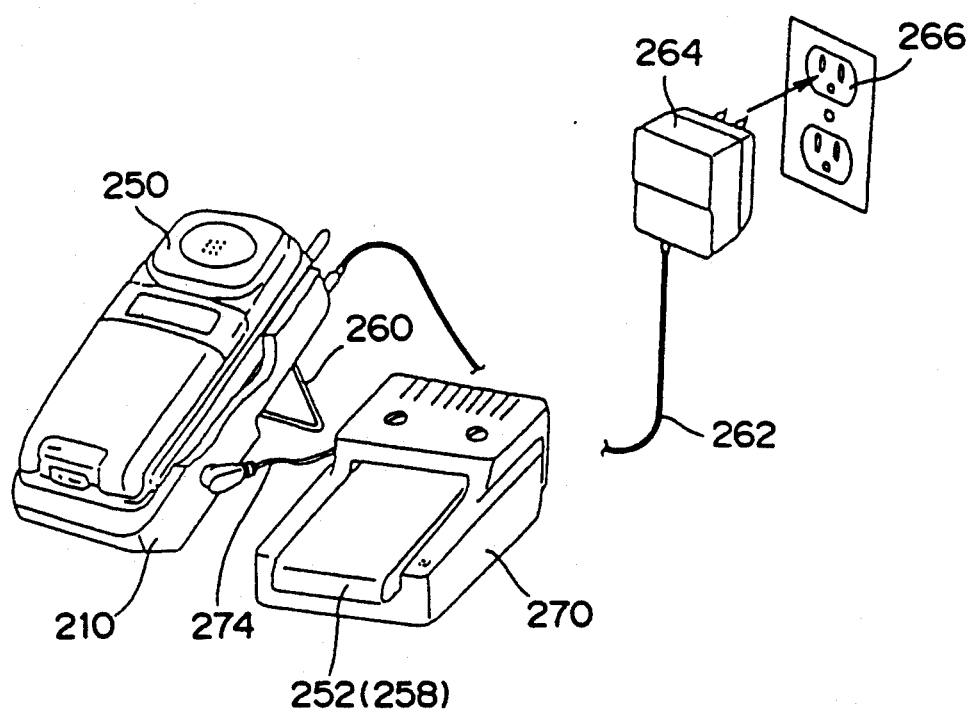
FIG. 22 is a perspective view showing a connected state of the battery pack charger with the portable telephone charger.

Referring to FIG. 22, there is illustrated a mode of use in which the battery pack charger 270 is not rendered integral with the charger 210 but both are connected through the cord 274 and charged in this connected state. The small-capacity battery pack 252 or the large-capacity battery pack 258 is mounted to the battery pack charger 270 and the charger 210 is kept inclined at a predetermined angle by the stand 260 during charging.

Figure 23:
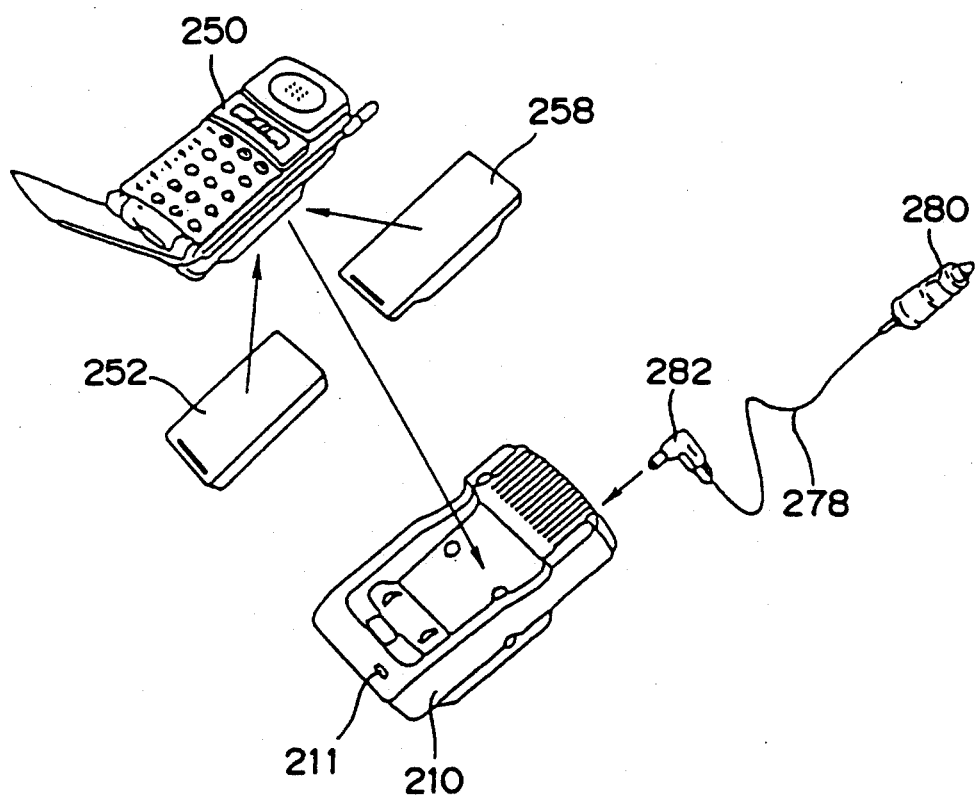
FIG. 23 is an exploded perspective view showing the portable telephone charger as used on an automobile.

FIG. 23 is an exploded perspective view showing an on-vehicle mode of use of the portable telephone charger. By inserting a plug 280 of a cigar lighter cord 278 into an automobile cigar lighter and connecting a connector 282 to the charger 210, the small-capacity battery pack 252 or the large-capacity battery pack 258 mounted to the portable telephone 250 can be charged by the charger 210.

Figure 24:
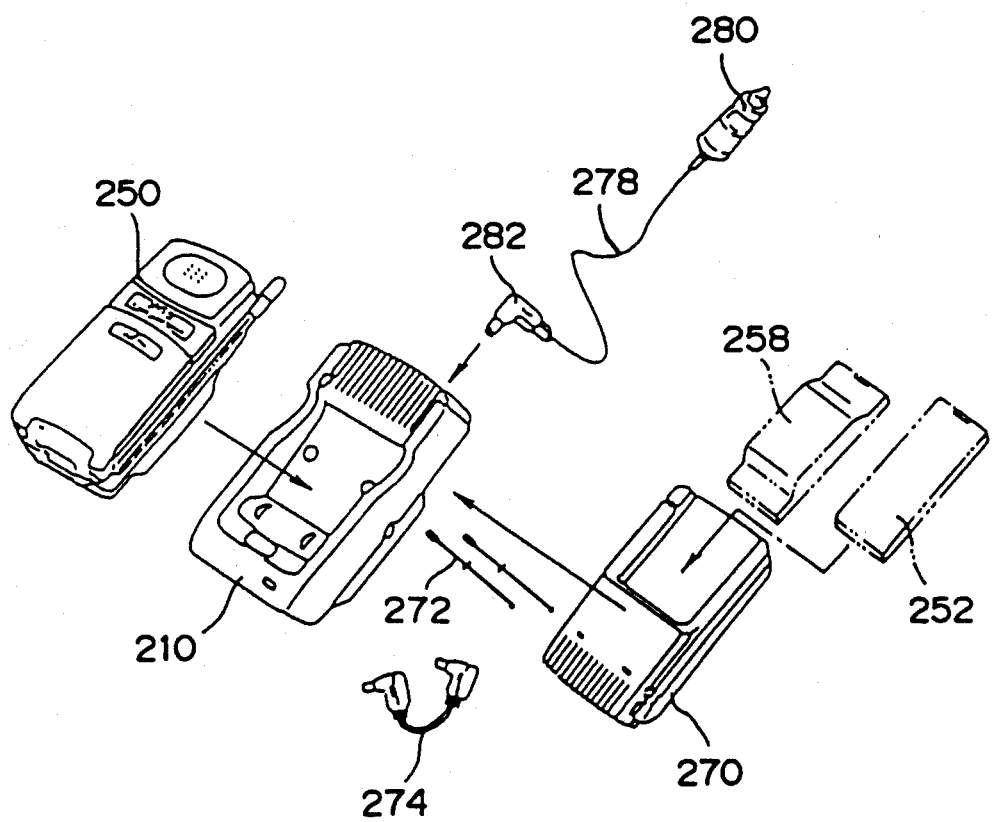
FIG. 24 is an exploded perspective view of the combination of FIG. 23 with the battery pack charger added thereto.
Figure 25:
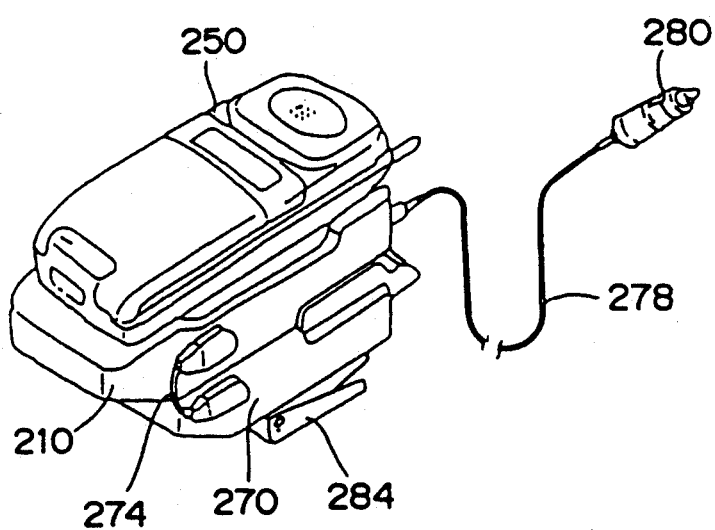
FIG. 25 is a perspective showing an assembled state of the combination of FIG. 24.

Referring now to FIGS. 24 and 25, there is illustrated a mode of use in the portable telephone charger-battery pack charger combination, in which the charger 210 and the battery pack charger 270 are rendered integral with each other using the connecting rods 272, and the charger 210 and the battery pack charger 270 are connected electrically through the cord 274. By inserting the plug 280 of the cigar lighter cord 278 into the automobile cigar lighter and connecting the connector 282 to the charger 210, the battery pack mounted to the portable telephone 250 and the battery pack mounted to the battery pack charger 270 can be charged simultaneously. The reference numeral 284 in FIG. 25 denotes a clamshell (a mounting member) of the automobile.

A coupling system for the portable telephone charger 210 and the battery pack charger 270 will now be described in detail with reference FIGS. 26 to 30. As shown in FIGS. 27A and 27B, the connecting rods 272 each have a pair of elastic engaging projections 272a formed on one end side thereof, a pair of engaging keys 272b formed on the other end side, and a stopper 272c of a large diameter formed approximately in a middle position.

Figure 26:
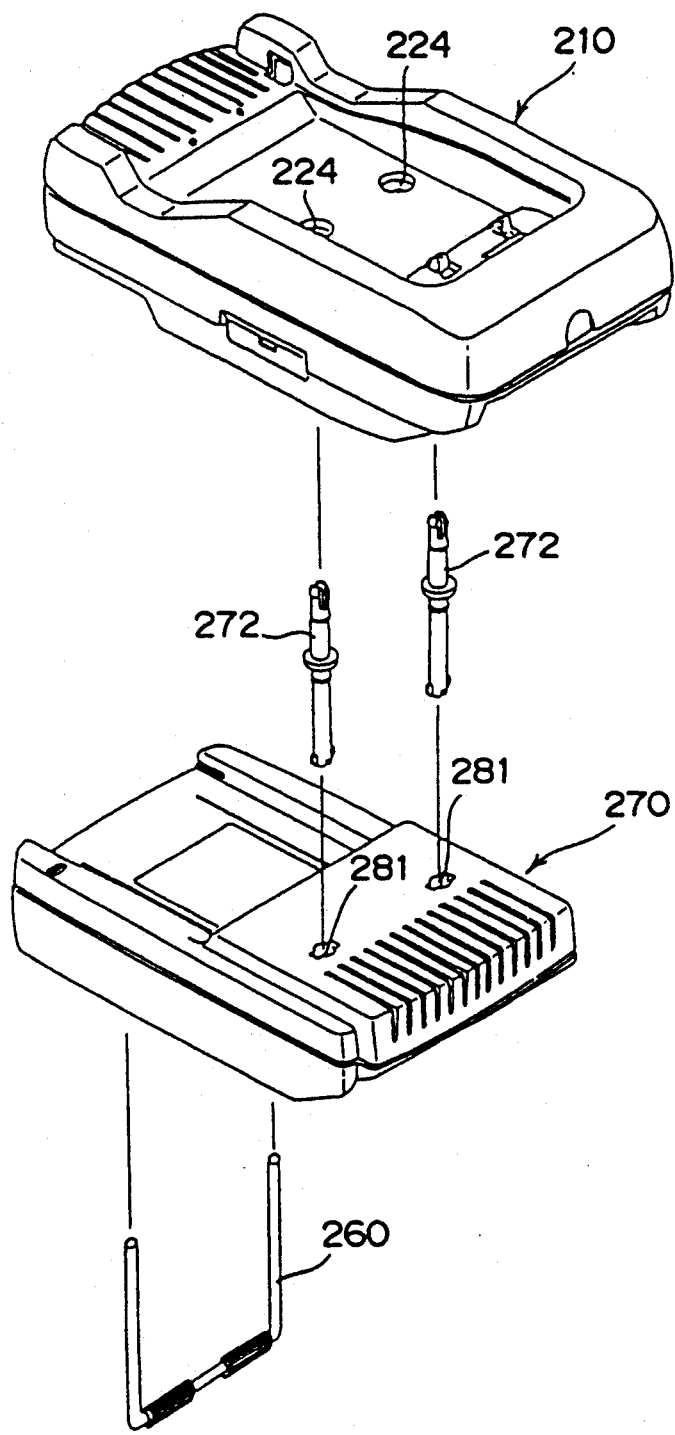
FIG. 26 is an exploded perspective view showing the manner in which the portable telephone charger and the battery pack charger are coupled together using connecting rods.
Figures 27A, 27B:
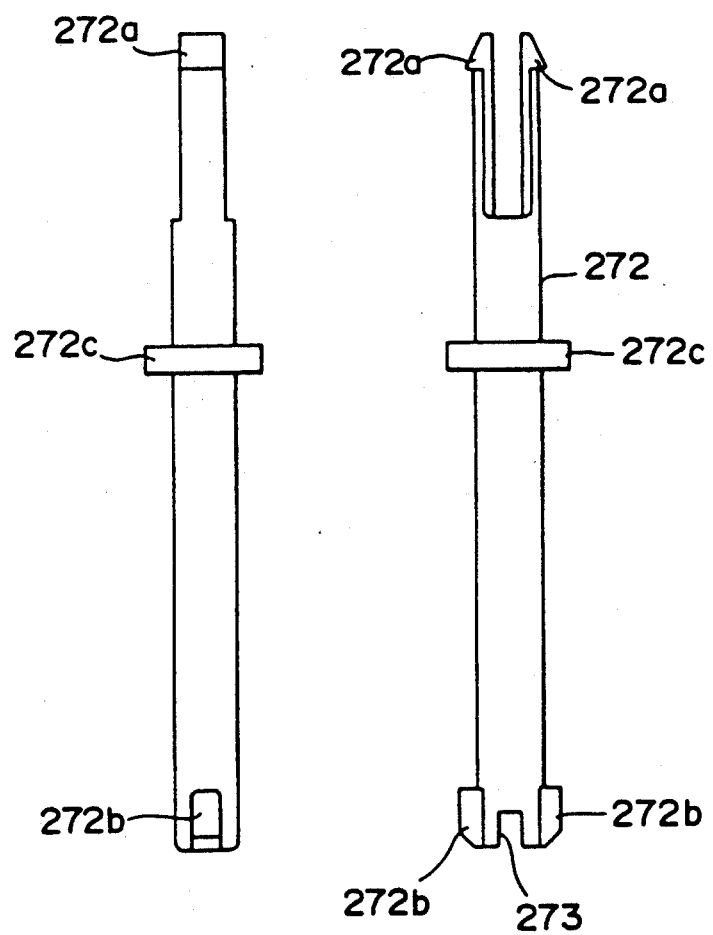
FIG. 27A is a front view of a connecting rod shown in FIG. 26.
FIG. 27B is a side view of the connecting rod shown in FIG. 26.

As shown in FIG. 26, the battery pack charger 270 has a pair of key holes 281 of a sectional shape corresponding to the engaging keys 272b. When the engaging keys 272b of the connecting rods 272 are inserted into the key holes 281 of the battery pack charger 270 up to positions restricted by the stoppers 272c, the engaging keys 272b project into hexagonal engaging concaves 283 contiguous to the key holes 282. By rotating the connecting rods 272 approximately 90°, the engaging keys 272b are brought into engagement with the engaging concaves 283, whereby the connecting rods 272 are fixed to the battery pack charger 270.

On the other hand, when the elastic engaging projections 272a of the connecting rods 272 are inserted into the through holes 231, the projections 272a fall inside and pass through the holes 231. When the elastic engaging projections 272a reach the concaves 224 of a large diameter, they revert to the original state and are engaged with the concave portions 224, whereby the connecting rods are fixed to the charger 210.

Thus, the portable telephone charger 210 and the battery pack charger 270 are coupled together easily by using the paired connecting rods 272. Where required, both can be disconnected from each other easily by pulling the charger 210 with a slight force in the axial direction of the connecting rods 272. Further, since a concave portion 273 is formed on the engaging key 272b side of each connecting rod 272, the connecting rods 272 can be removed from the battery pack charger 270 by rotating them with a minus screwdriver.

In the coupled state of the charger 210 and the battery pack charger 270 through the connecting rods 272, the stoppers 272c are fitted in fitting portions 231a of a large diameter formed contiguously to the through holes 231 of the charger 210, whereby the charger 210 and the battery pack charger 270 can be kept in close contact with each other.

Figure 29:
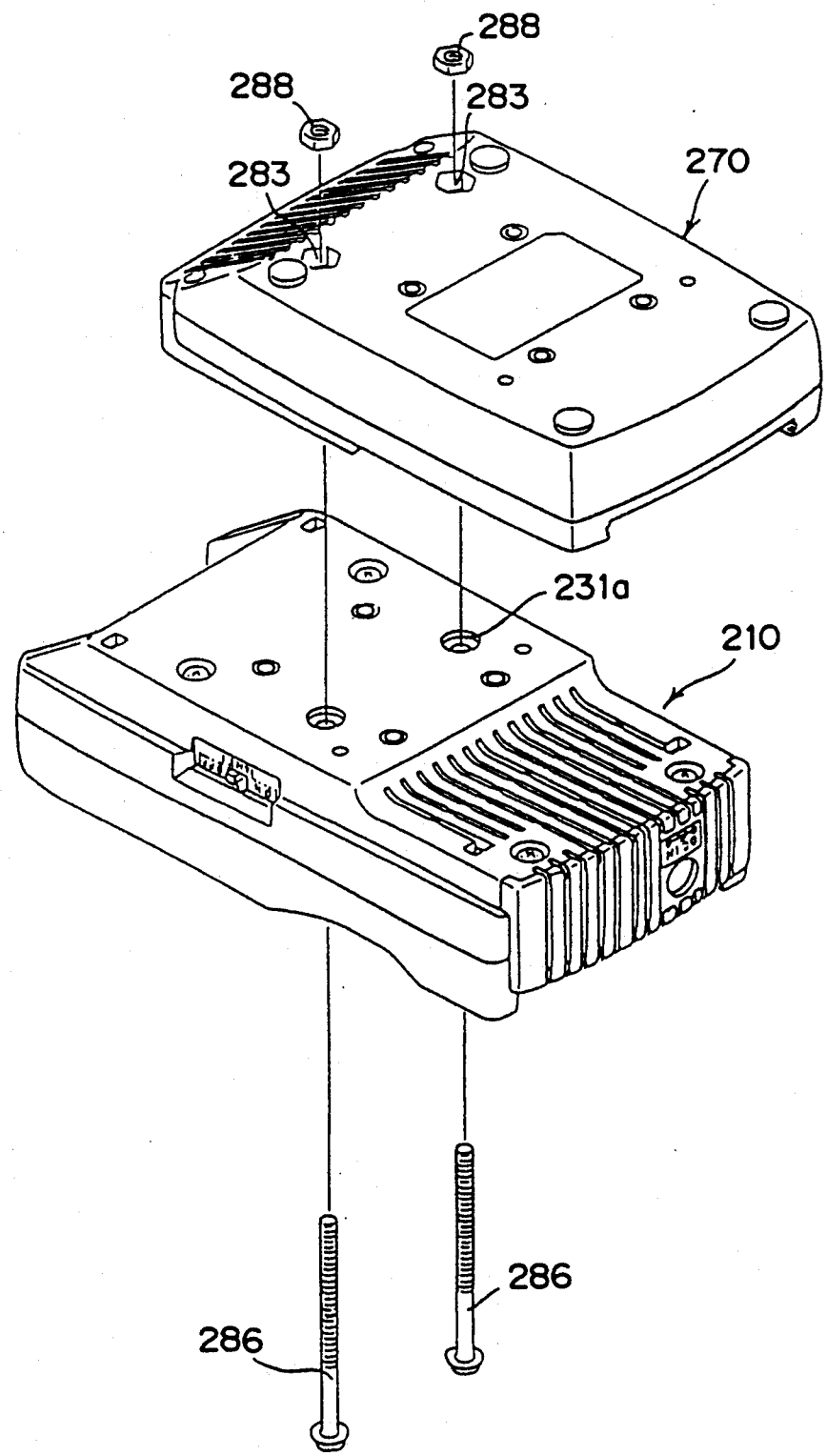
FIG. 29 is an exploded perspective view showing the manner in which the portable telephone charger and the battery pack charger are coupled together using bolts and nuts.
Figure 30:
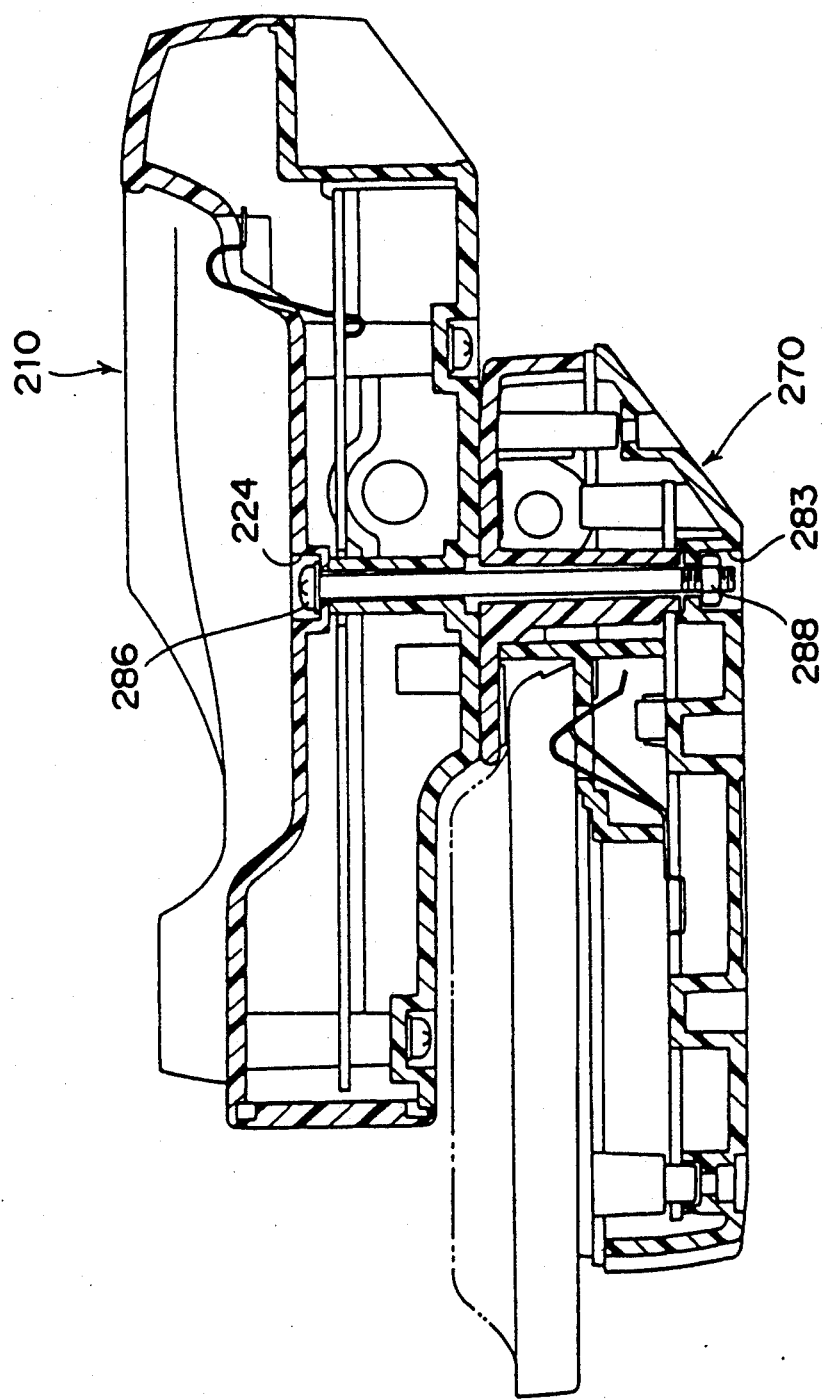
FIG. 30 is a sectional view showing a coupled state of the portable telephone charger and the battery pack charger using bolts and nuts.

The following description is now provided with reference to FIGS. 29 and 30 about the case where the portable telephone charger 210 and the battery pack charger 270 are to be coupled firmly using bolts 286 and nuts 288 in combination. In this case, the bolts 286 are inserted through the through holes 231 and the key holes 281 from the charger 210 side. Then, by inserting the nuts 288 into the hexagonal engaging concaves 283 and rotating the bolts 286, the charger 210 and the battery pack charger 270 can be coupled firmly.

The coupling using such bolts and nuts is desirable particularly in the case of coupling the charger 210 and the battery pack charger 270 in a moving body which undergoes vigorous vibrations such as an automobile.

What is claimed is:

1. An adaptor for a portable radio apparatus adapted to mount the portable radio apparatus to a moving body, the portable radio apparatus having a battery pack attached thereto, said battery pack being either a large-capacity battery pack or a small-capacity battery pack adapted to be mounted selectively, said large-capacity battery pack having a swelled bottom, a retaining slot formed in the bottom of both the large-capacity battery pack and that of the small-capacity battery pack, and a retaining slot formed in one end of the portable radio apparatus, said adaptor for the portable radio apparatus comprising:

a case for mounting the portable radio apparatus thereto, said case having a recess formed in a top thereof for receiving the swelled bottom of said large-capacity battery pack, said case further having a pair of guides for guiding both sides of the portable radio apparatus, a first projection adapted for engagement with the retaining slot of the portable radio apparatus, and a second projection adapted for engagement with the retaining slot of the battery pack, with openings being formed opposedly to each other in inner surfaces of said paired guides;

a printed circuit board accommodated within said case, said printed circuit board having a charging circuit formed thereon;

a pair of ratchets adapted to enter and have the openings formed in said guides, said ratchets each having a tapered portion whose thickness in the vertical direction is smaller at a first end thereof;

urging means for urging said paired ratchets toward each other; and a pair of charging terminals connected electrically to the charging circuit on said printed circuit board and projecting from the top of said case.

2. An adaptor for a portable radio apparatus according to claim 1, wherein said urging means comprises a pair of L-shaped ribs formed integrally with said ratchets respectively, said L-shaped ribs being disposed so that insides of the L-shape ribs are opposed to each other, a support plate for supporting said L-shaped ribs inside said case whereby said ribs are slidable with respect to the case, and a coil spring interposed between said L-shaped ribs.

3. An adaptor for a portable radio apparatus according to claim 1, wherein said urging means comprises a pair of coil springs accommodated within said paired guides of said case.

4. An adaptor for a portable radio apparatus according to claim 1, further having a pair of holes for mounting of a stand and a pair of holes for connection of other devices.

5. A charger for a portable radio apparatus capable of charging a battery pack, said battery pack being attached to the portable radio apparatus, said battery pack being either a large-capacity battery pack or a small-capacity battery pack adapted to be mounted selectively, said large-capacity battery pack having a swelled bottom, a retaining slot formed in the bottom of both the large-capacity battery pack and that of the small-capacity battery pack, and a retaining slot formed in one end of the portable radio apparatus, said charger for the portable radio apparatus comprising:

a case for mounting the portable radio apparatus thereto, said case having a recess formed in a top thereof for receiving the swelled bottom of said large-capacity battery pack, said case further having a pair of guides for guiding both sides of the portable radio apparatus, a first projection adapted for engagement with the retaining slot of the portable radio apparatus, and a second projection adapted for engagement with the retaining slot of the battery pack;

a printed circuit board accommodated within said case, said printed circuit board having a charging circuit formed thereon, and a pair of charging terminals connected electrically to the charging circuit on said printed circuit board and projecting from the top of said case.

6. A charger for a portable radio apparatus according to claim 5, further having a pair of holes for mounting of a stand and a pair of holes for connection of other devices.

7. A coupling system for the coupling of a portable radio apparatus charger capable of charging a battery pack which is mounted to the portable radio apparatus and a battery pack charger capable of charging the battery pack which is mounted directly to said battery pack charger, said coupling system comprising:

a pair of first through holes formed in said portable radio apparatus charger;

a pair of second through holes formed in said battery pack charger; and a pair of connecting rods inserted into said first and second through holes for integral coupling of said portable radio apparatus charger and said battery pack charger.

8. A coupling system according to claim 7, wherein each of said connection rods has an elastic engaging projection formed at one end thereof, an engaging key formed at an opposite end thereof, and a stopper formed at an intermediate part thereof; each of said first through holes comprises a hole portion of a small diameter and a concave portion of a larger diameter; each of said second through holes has a section of a key hole shape corresponding to said engaging key and has an engaging concave portion at one end thereof whereby when said connecting rods have each been inserted into said portable radio apparatus charger and said battery pack charger up to a position restricted by said stopper, said elastic engaging projection comes into engagement with said concave portion of a larger diameter, and said engaging key comes into engagement with said engaging concave portion.

* * * * *

UNITED STATES PATENT AND TRADEMARK OFFICE
CERTIFICATE OF CORRECTION

PATENT NO. : 5,189,358

DATED : February 23, 1993

INVENTOR(S) : MASASHI TOMURA, HISAMITSU TAKAGI and YOSHIHIRO MATSUMOTO

It is certified that error appears in the above-identified patent and that said Letters Patent is hereby corrected as shown below:

Column 3, line 15, "potable" should be --portable--.

Column 6, line 28, after ""the" delete the comma ",".

Column 8, line 42, "The-members" should be

--The members--.

Figure 28:
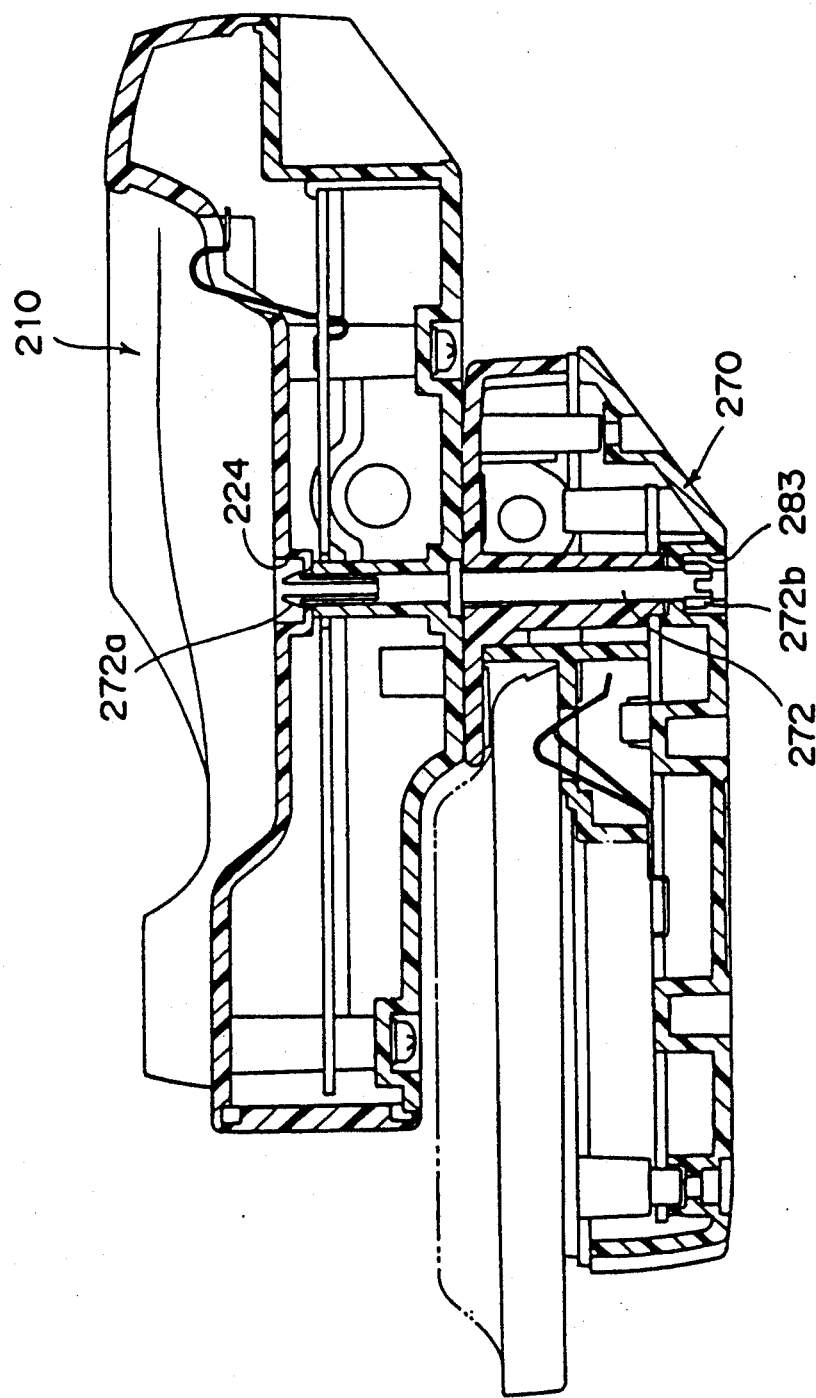
FIG. 28 is a sectional view showing a coupled state of the portable telephone charger and the battery pack charger using the connecting rods.

Column 10, line 48, after "reference" insert --to--;

line 65, "concaves 283" should be --concave portions 283 as shown in FIG. 28--.

Column 11, line 3, "concaves" should be --concave portions--.

Signed and Sealed this

Thirtieth Day of November, 1993

*Attest:*

BRUCE LEHMAN

*Attesting Officer*  *Commissioner of Patents and Trademarks*